(12) United States Patent
Komine

(10) Patent No.: US 10,747,910 B2
(45) Date of Patent: Aug. 18, 2020

(54) NETWORK APPARATUS, INPUT AND OUTPUT APPARATUS, AND PROGRAM

(71) Applicant: Yoshitaka Komine, Kanagawa (JP)

(72) Inventor: Yoshitaka Komine, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 159 days.

(21) Appl. No.: 16/085,058

(22) PCT Filed: Apr. 19, 2017

(86) PCT No.: PCT/JP2017/015747
§ 371 (c)(1),
(2) Date: Sep. 14, 2018

(87) PCT Pub. No.: WO2017/183658
PCT Pub. Date: Oct. 26, 2017

(65) Prior Publication Data
US 2020/0019736 A1 Jan. 16, 2020

(30) Foreign Application Priority Data

Apr. 22, 2016 (JP) .................................. 2016-086219
Apr. 18, 2017 (JP) .................................. 2017-081999

(51) Int. Cl.
*G06F 15/16* (2006.01)
*G06F 21/85* (2013.01)
(Continued)

(52) U.S. Cl.
CPC ............. *G06F 21/85* (2013.01); *G06F 21/608* (2013.01); *H04L 61/256* (2013.01); *H04L 61/2514* (2013.01); *H04L 61/2532* (2013.01)

(58) Field of Classification Search
CPC ................................ G06F 21/85; G06F 21/608
(Continued)

(56) References Cited

U.S. PATENT DOCUMENTS 6,584,503 B1 6/2003 Carney et al.
7,610,411 B2 10/2009 Umekage et al.
(Continued)

FOREIGN PATENT DOCUMENTS

EP 0480593 4/1992
JP 2000-293334 10/2000
(Continued)

OTHER PUBLICATIONS

International Search Report dated Aug. 28, 2017 in PCT/JP2017/015747 filed on Apr. 19, 2017.

*Primary Examiner* — Brian Whipple
*Assistant Examiner* — Hannah S Wang
(74) *Attorney, Agent, or Firm* — IPUSA, PLLC

(57) ABSTRACT

A network apparatus includes: a plurality of network interfaces; a first communication unit configured to communicate with an input and output apparatus in a first network with which a first network interface of the plurality of network interfaces is coupled; a second communication unit configured to communicate with a first device in a second network with which a second network interface of the plurality of network interfaces is coupled; and a third communication unit configured to communicate with a second device in a third network with which a third network interface of the plurality of network interfaces is coupled. When the second communication unit receives data from the second network, the data is transmitted to the first network through the first communication unit without being transmitted to the third network. When the third communication unit receives data from the third network, the data is transmitted to the first network through the first communication unit without being transmitted to the second network.

10 Claims, 18 Drawing Sheets

(51) Int. Cl.
*G06F 21/60* (2013.01)
*H04L 29/12* (2006.01)

(58) Field of Classification Search
USPC .......................................... 709/227
See application file for complete search history.

(56) References Cited

U.S. PATENT DOCUMENTS

| | | | |
|---|---|---|---|
| 2006/0140698 A1 | 6/2006 | Nishi | |
| 2006/0206921 A1* | 9/2006 | Wang | G06F 21/85 726/3 |
| 2007/0019237 A1* | 1/2007 | Nobutani | G06F 3/1286 358/1.15 |
| 2008/0086762 A1* | 4/2008 | Kaneko | G06F 21/34 726/4 |
| 2012/0203926 A1* | 8/2012 | Camp | H04L 61/6013 709/238 |
| 2012/0240233 A1* | 9/2012 | Loman | G06F 21/51 726/24 |
| 2012/0266230 A1* | 10/2012 | Vanderpol | H04L 63/1441 726/11 |
| 2013/0242335 A1* | 9/2013 | Naitoh | G06F 3/1288 358/1.14 |

FOREIGN PATENT DOCUMENTS

| | | |
|---|---|---|
| JP | 2005-229332 | 8/2005 |
| JP | 2006-101344 | 4/2006 |

\* cited by examiner

[Fig. 1]
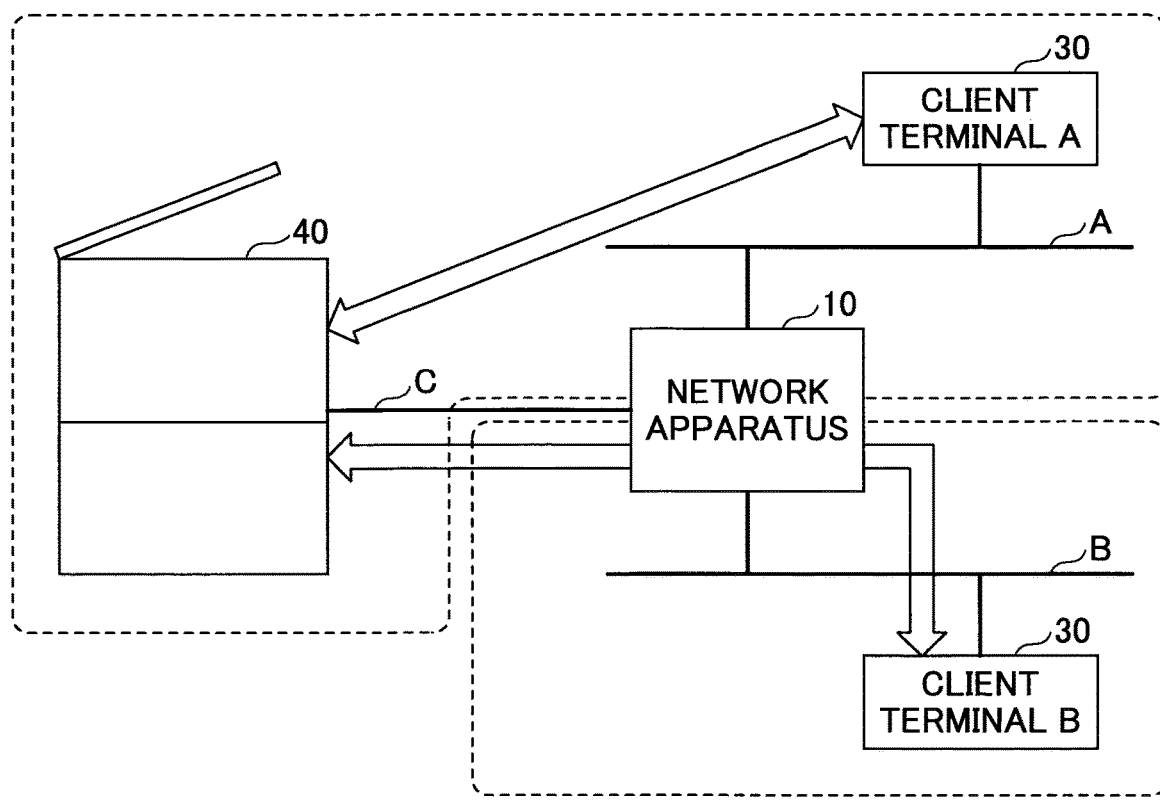

[Fig. 2]
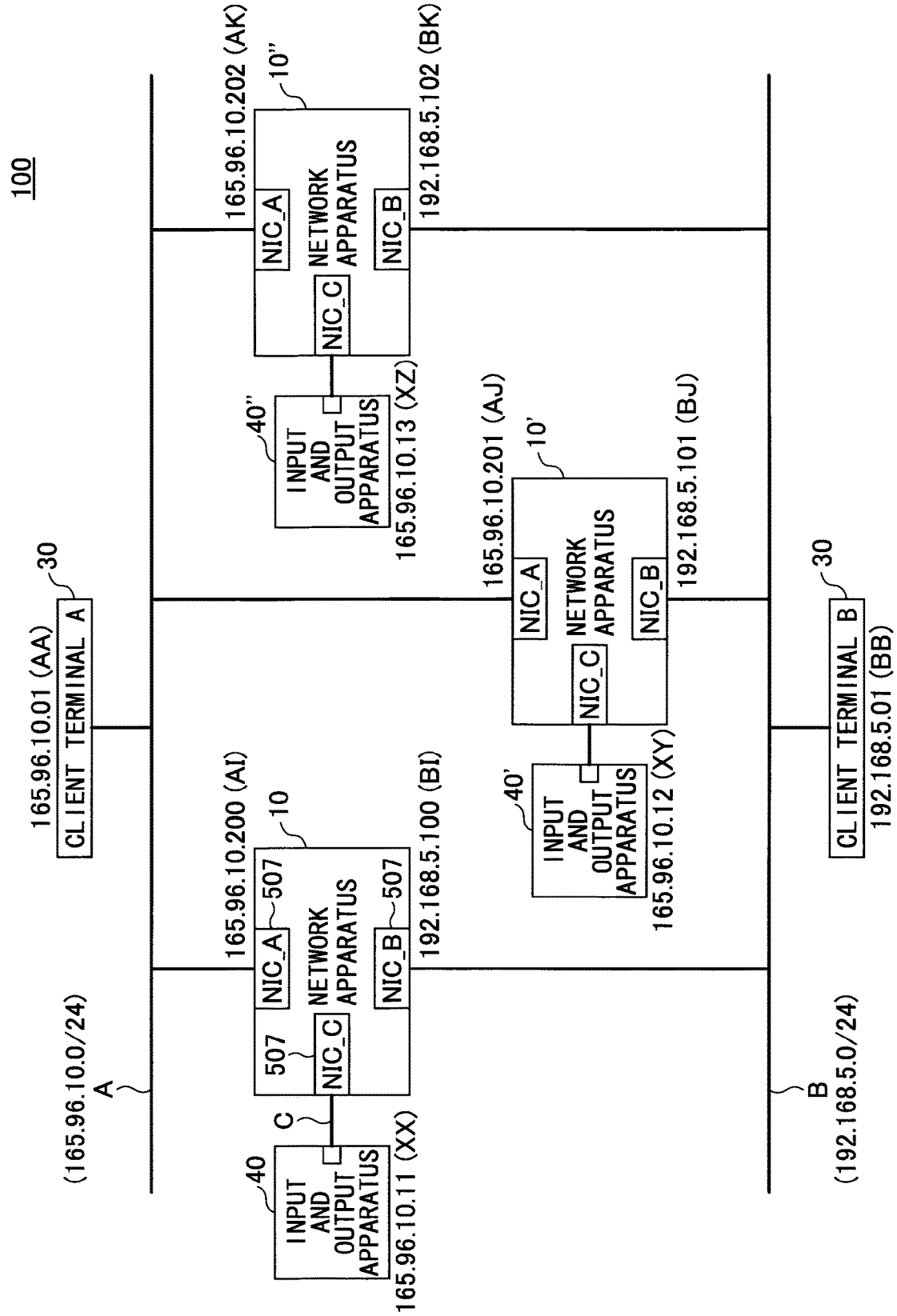

[Fig. 3]
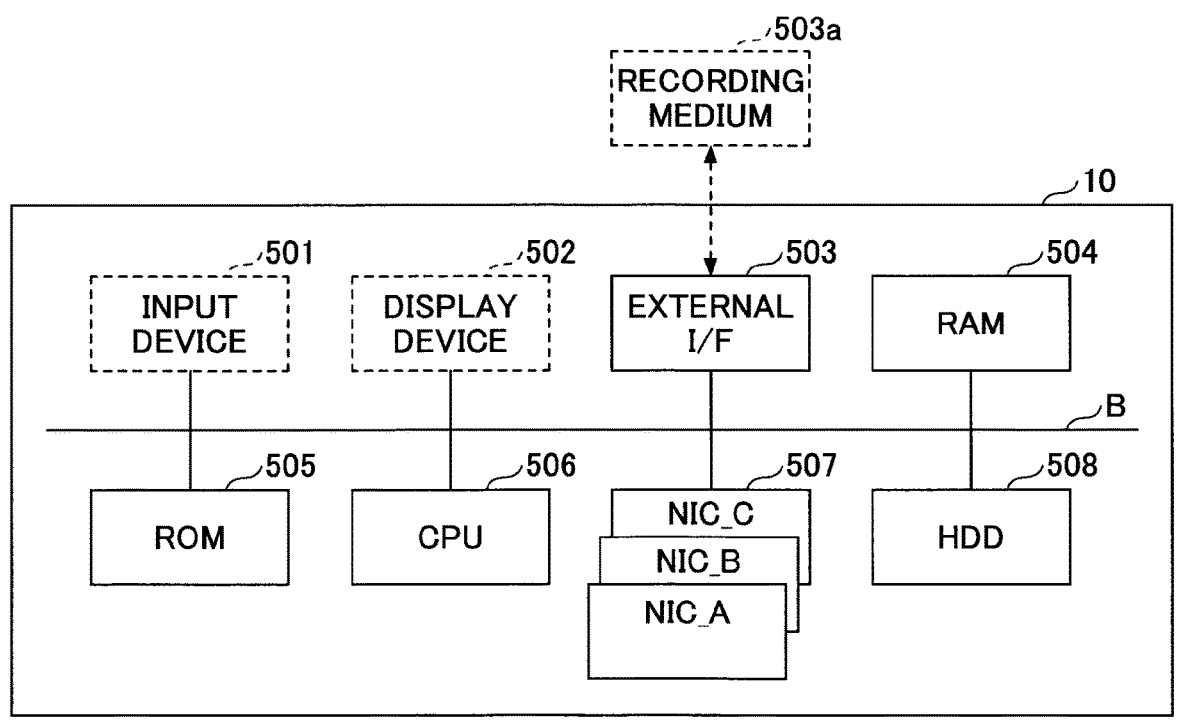

[Fig. 4]
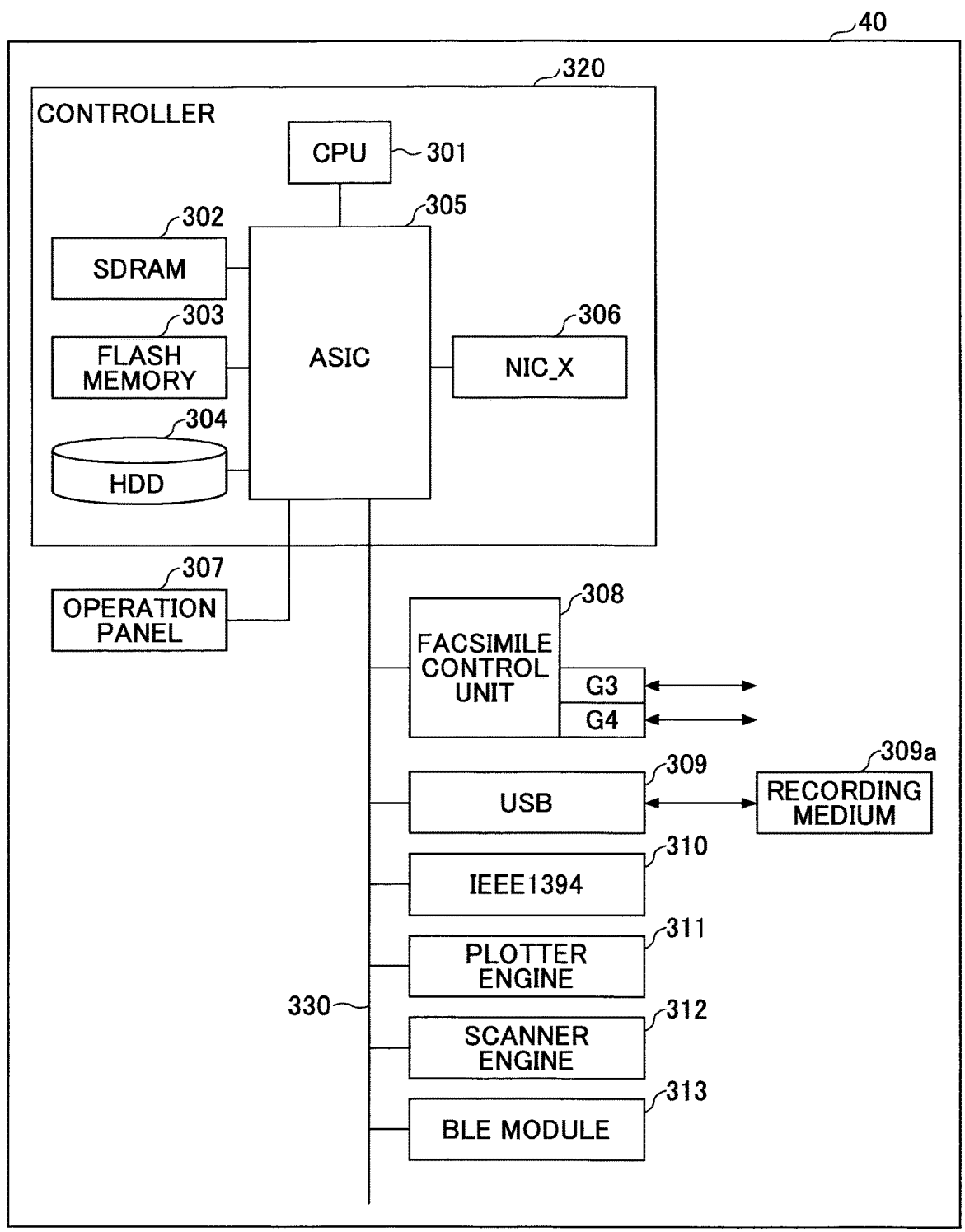

[Fig. 5]
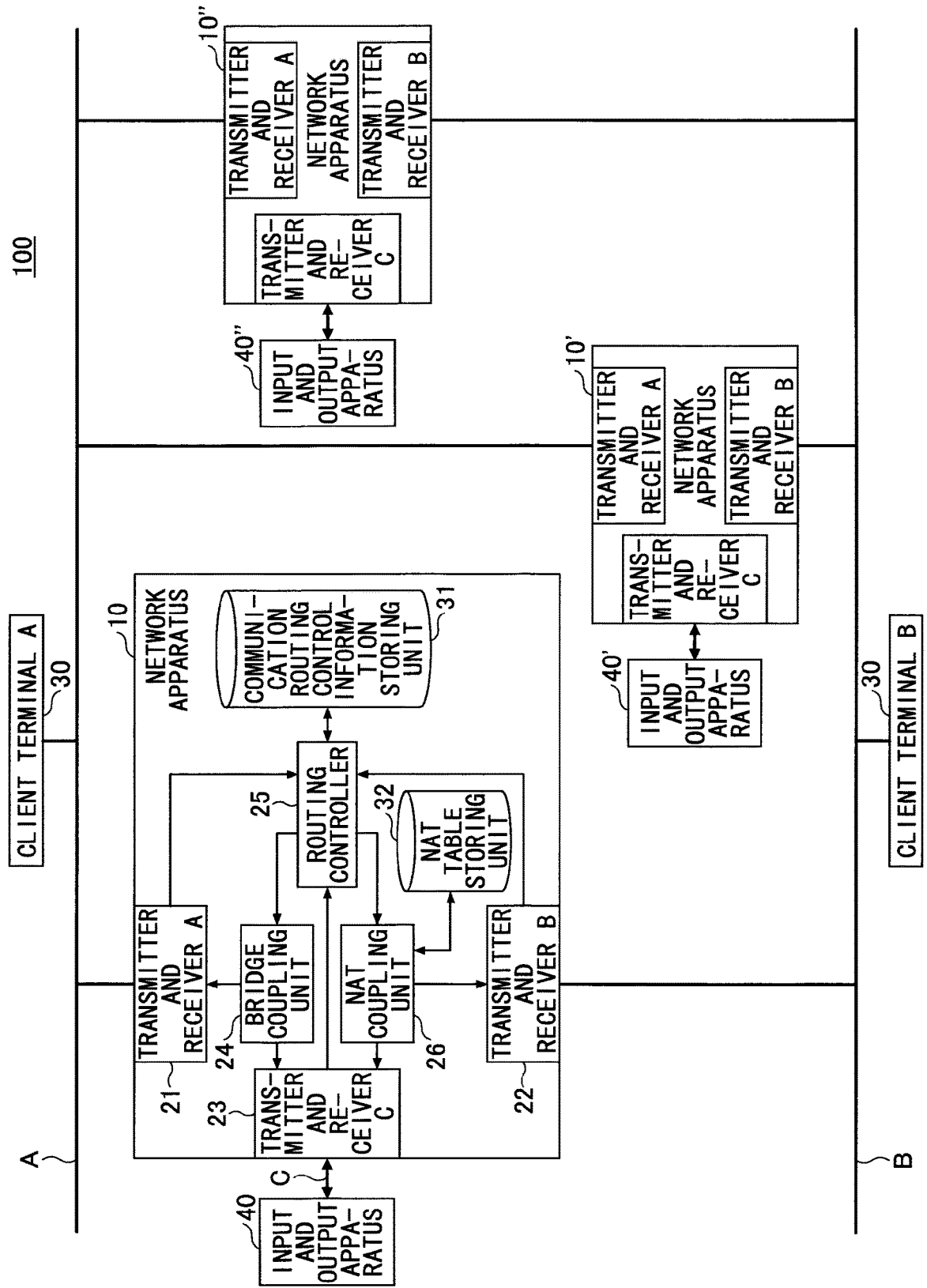

[Fig. 6]
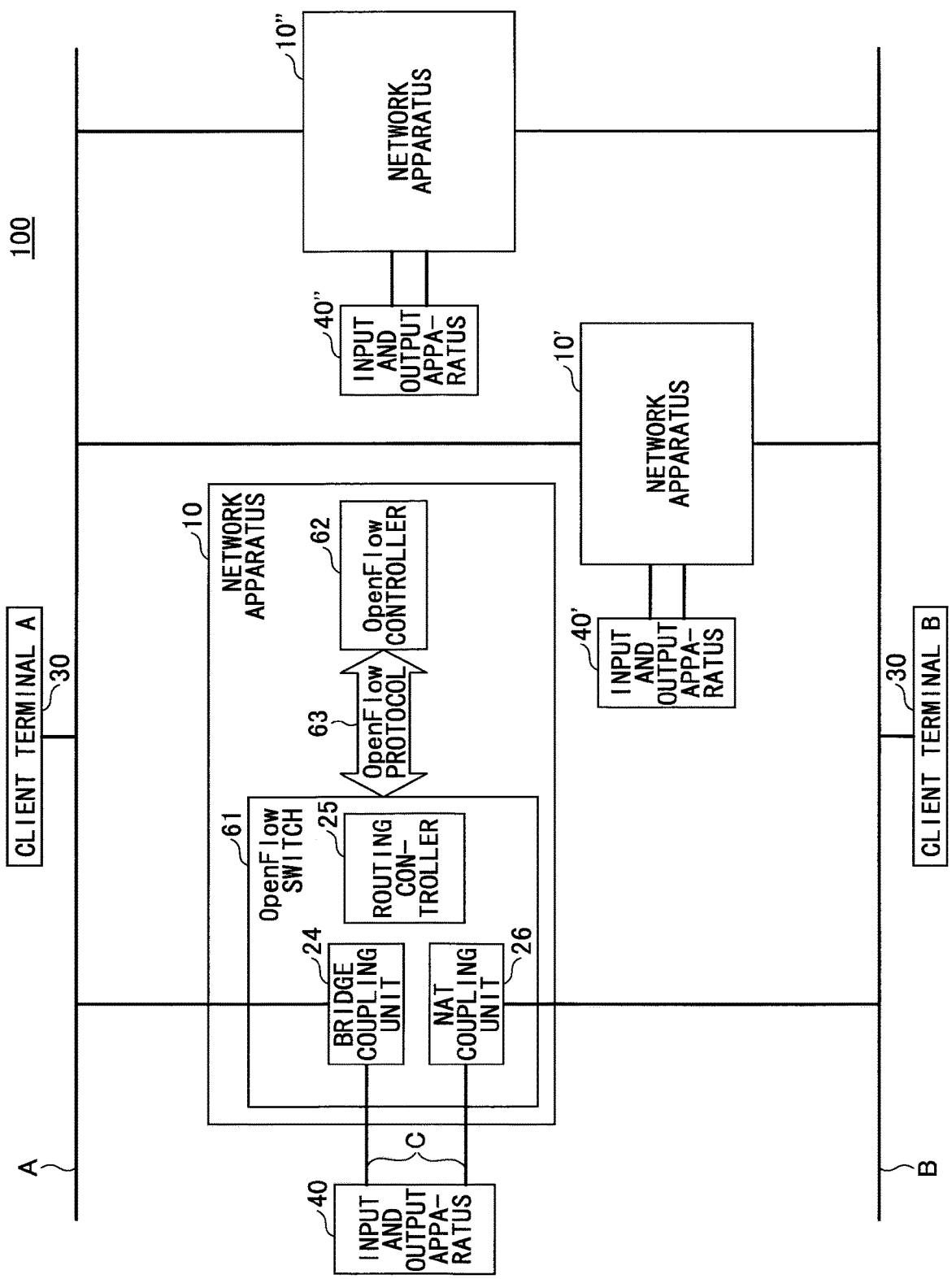

[Fig. 7A]
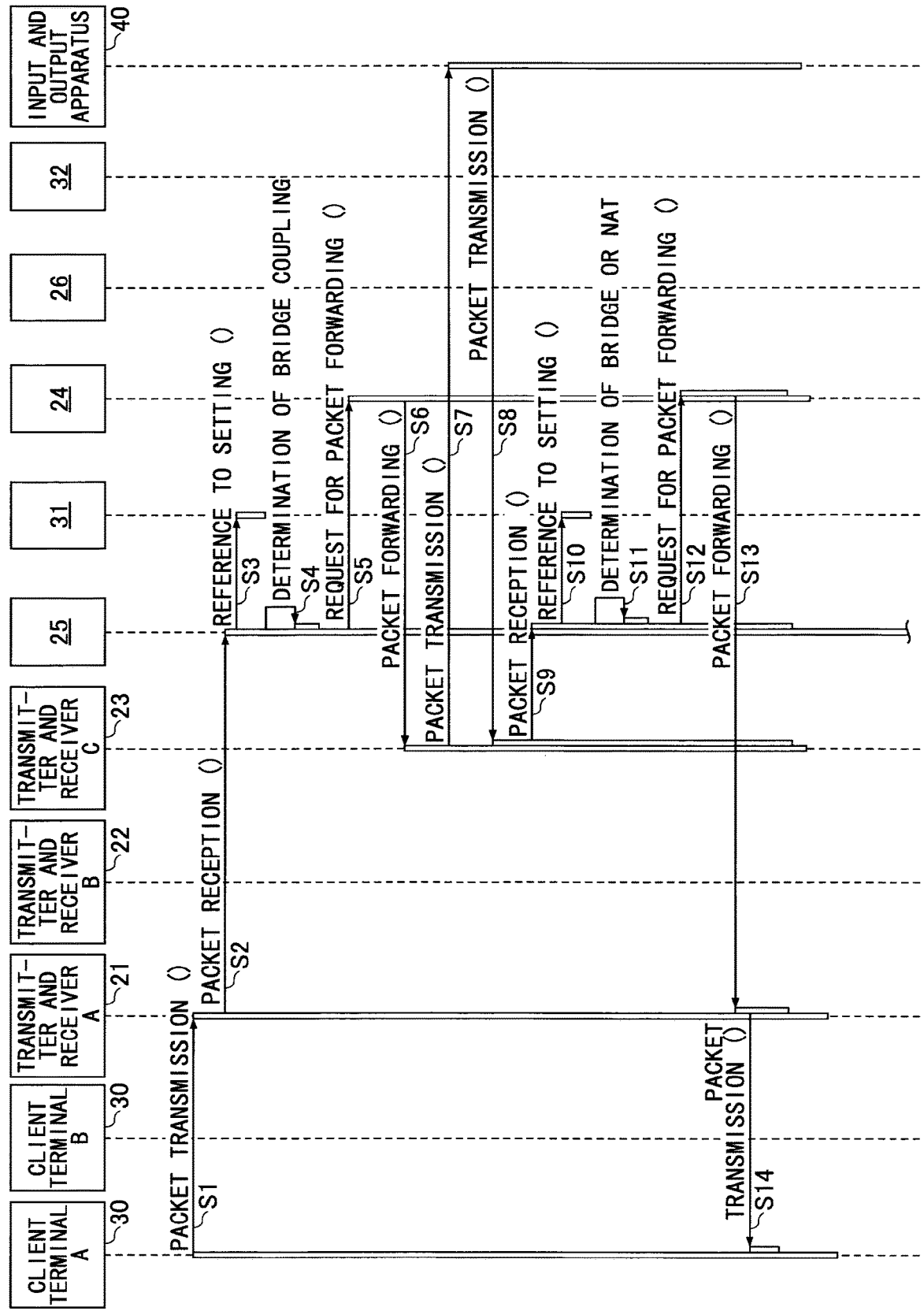

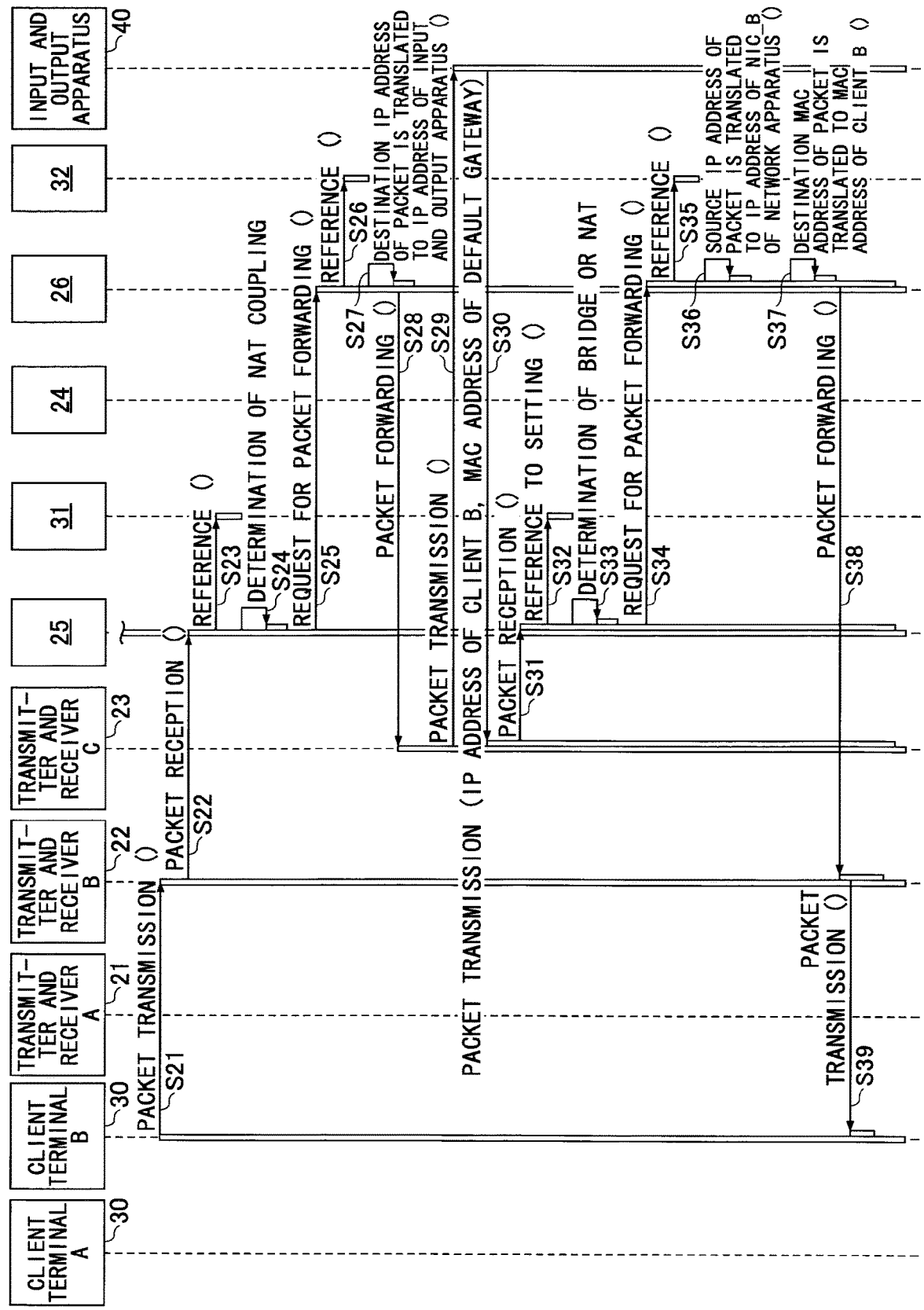
[Fig. 7B]

[Fig. 8]
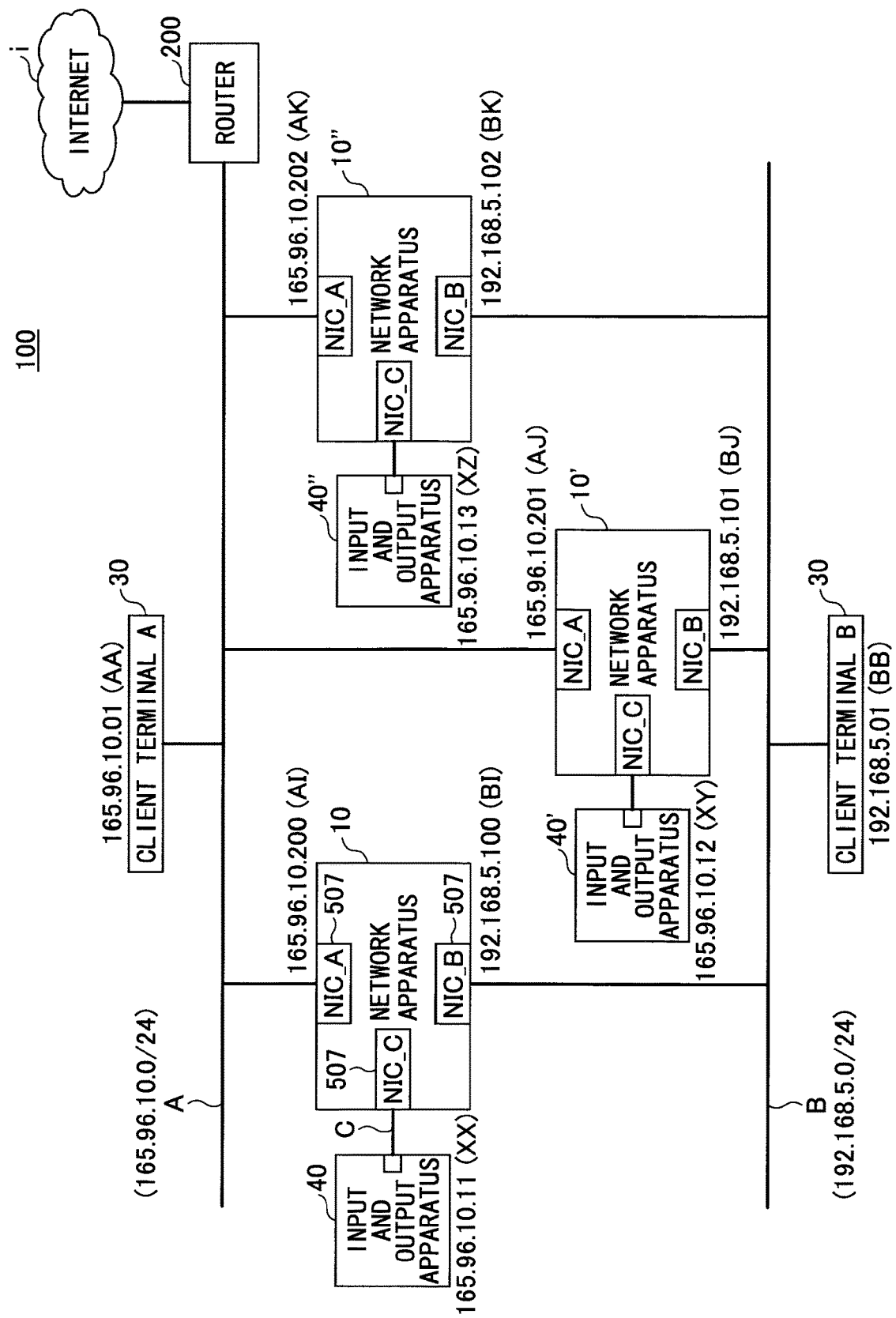

[Fig. 9A]
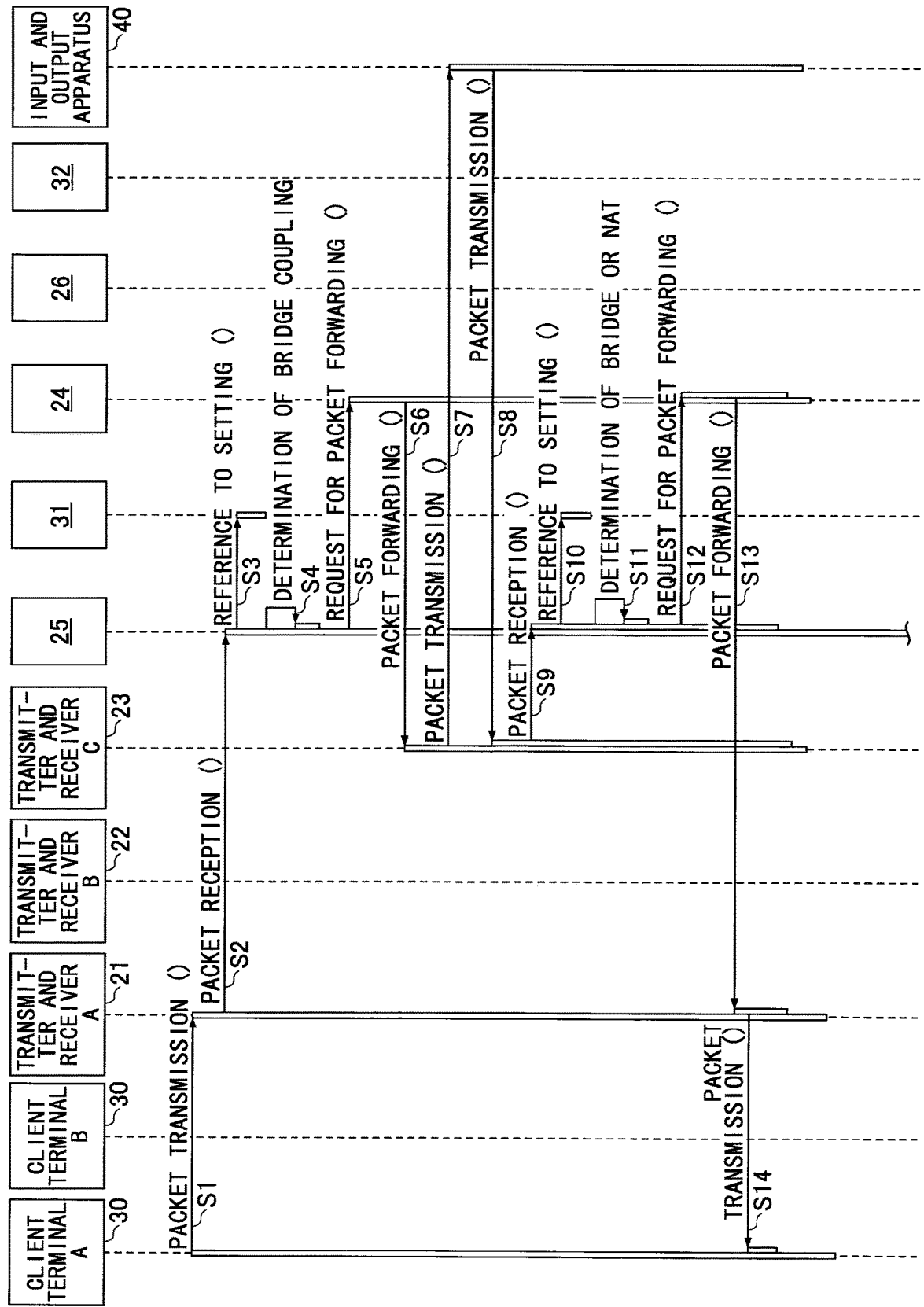

[Fig. 9B]
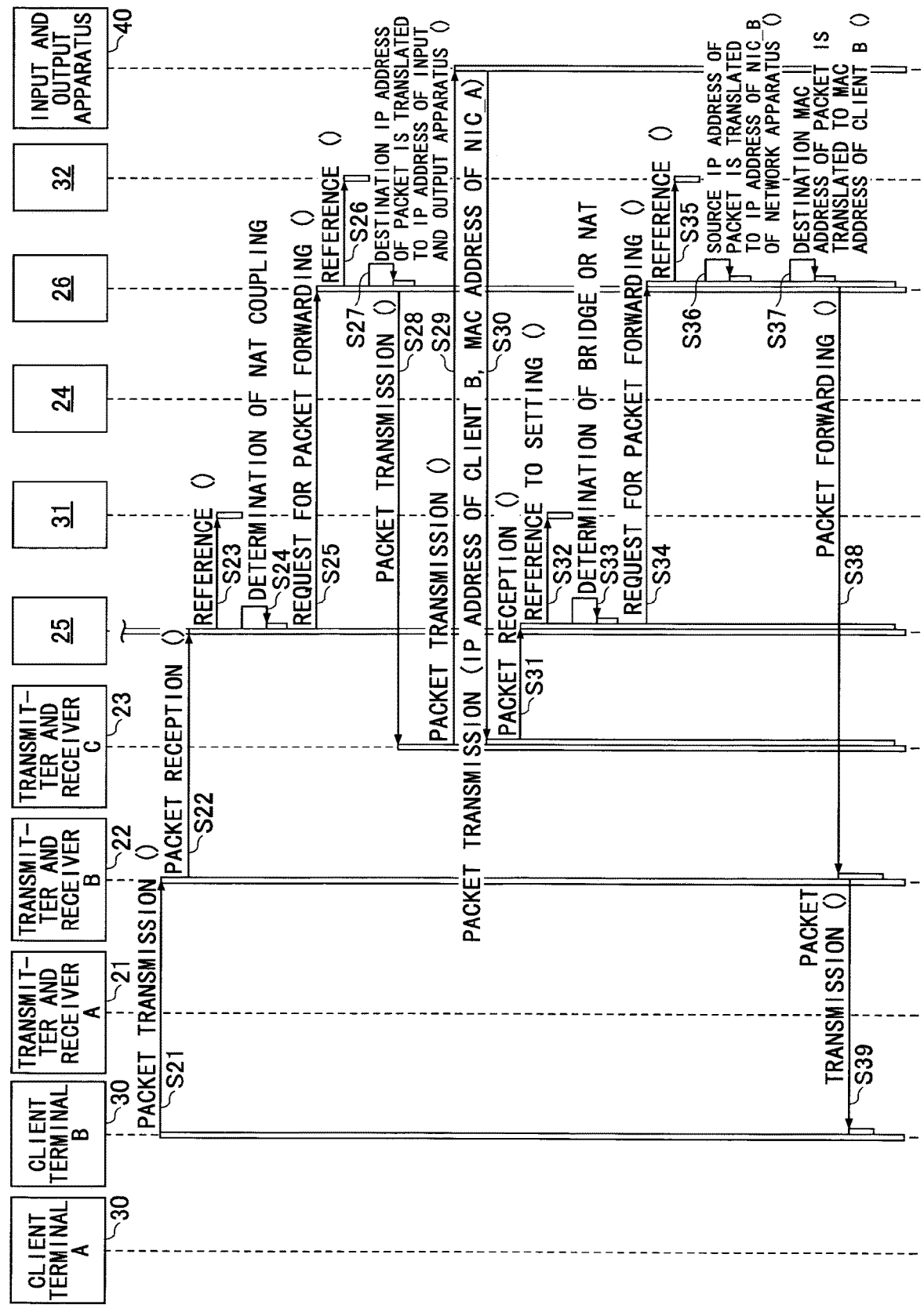

[Fig. 10]
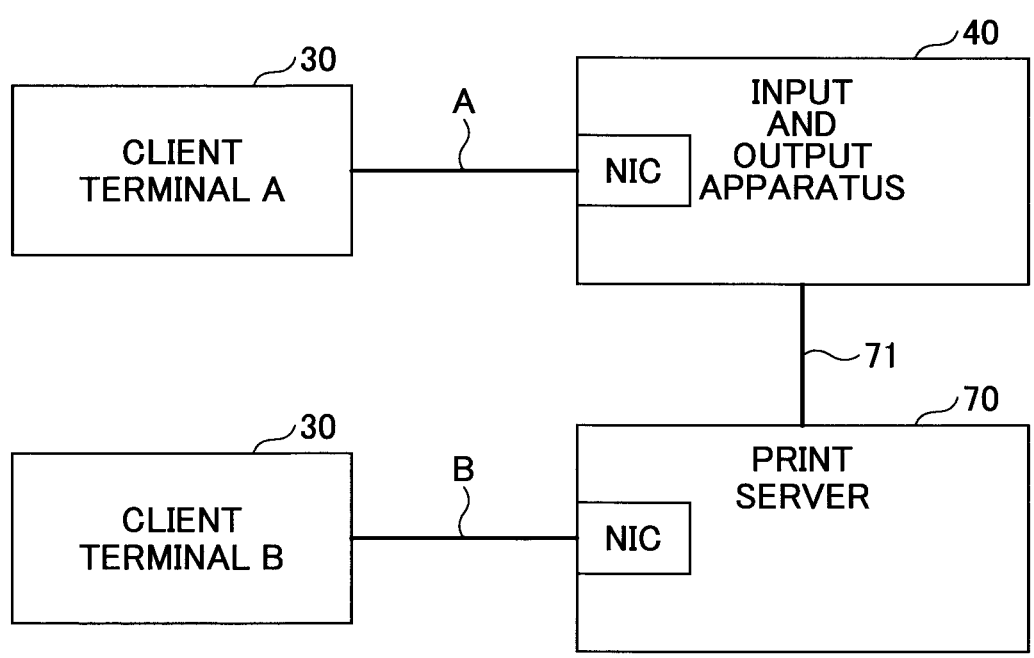

[Fig. 11]
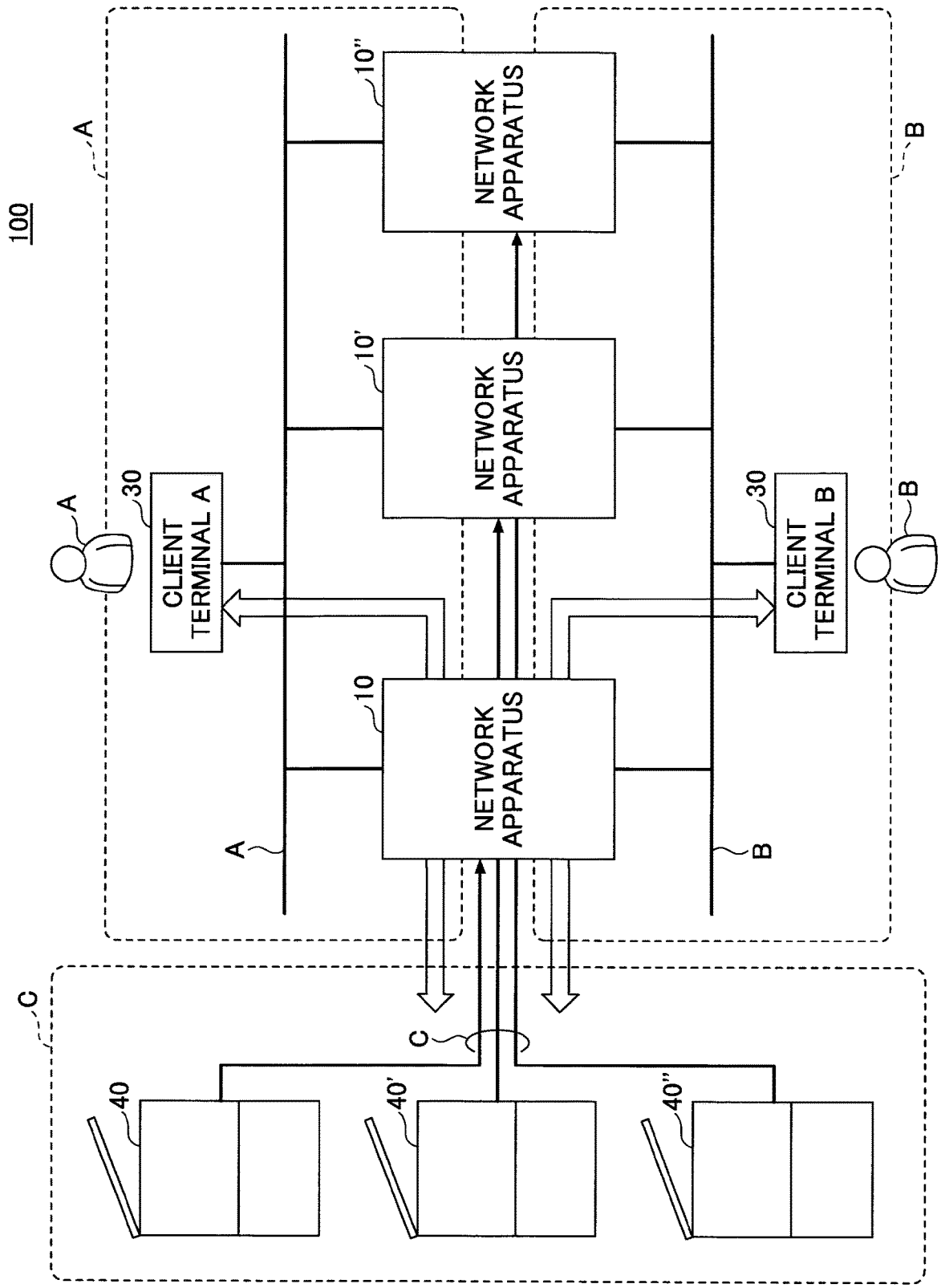

[Fig. 12]
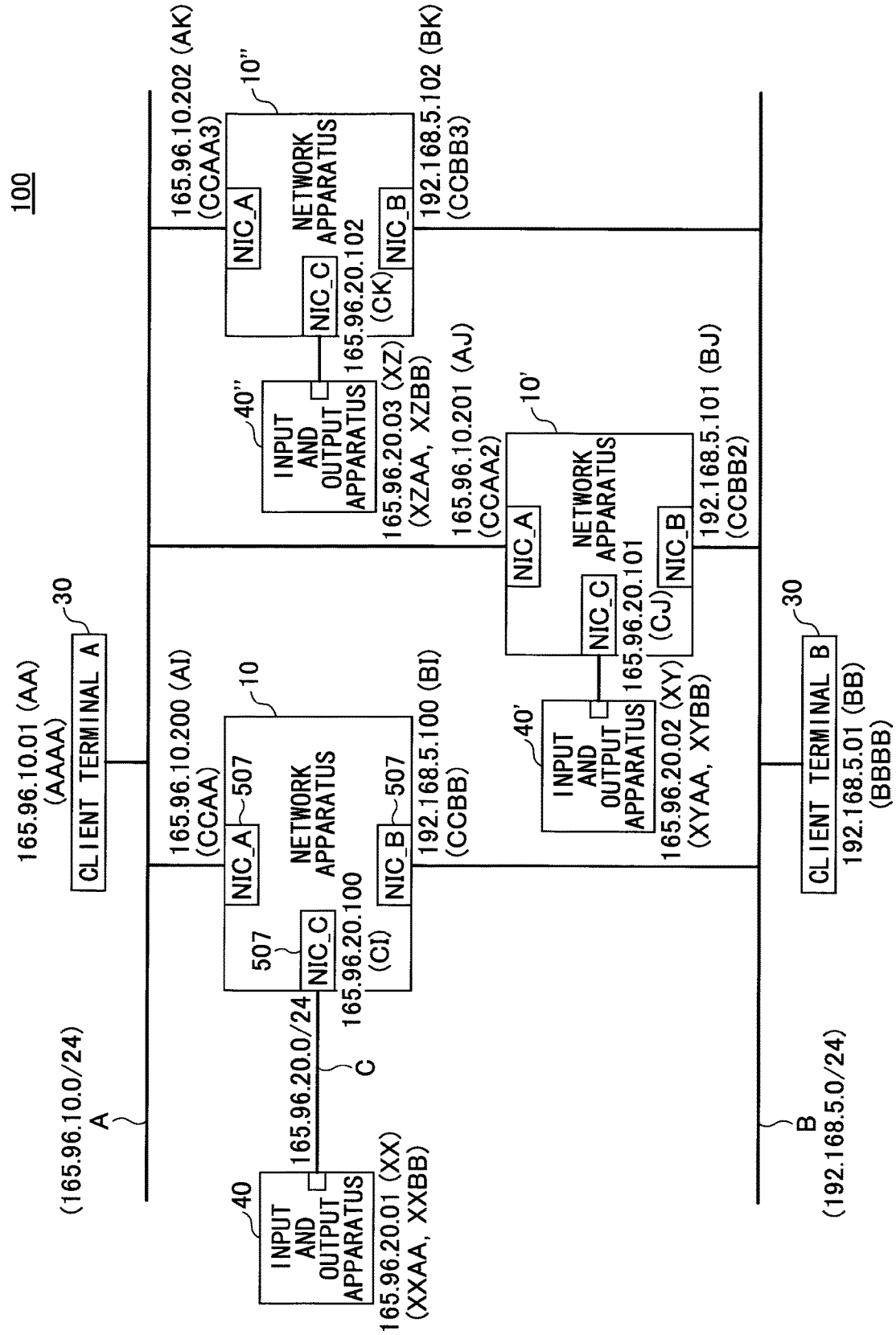

[Fig. 13]
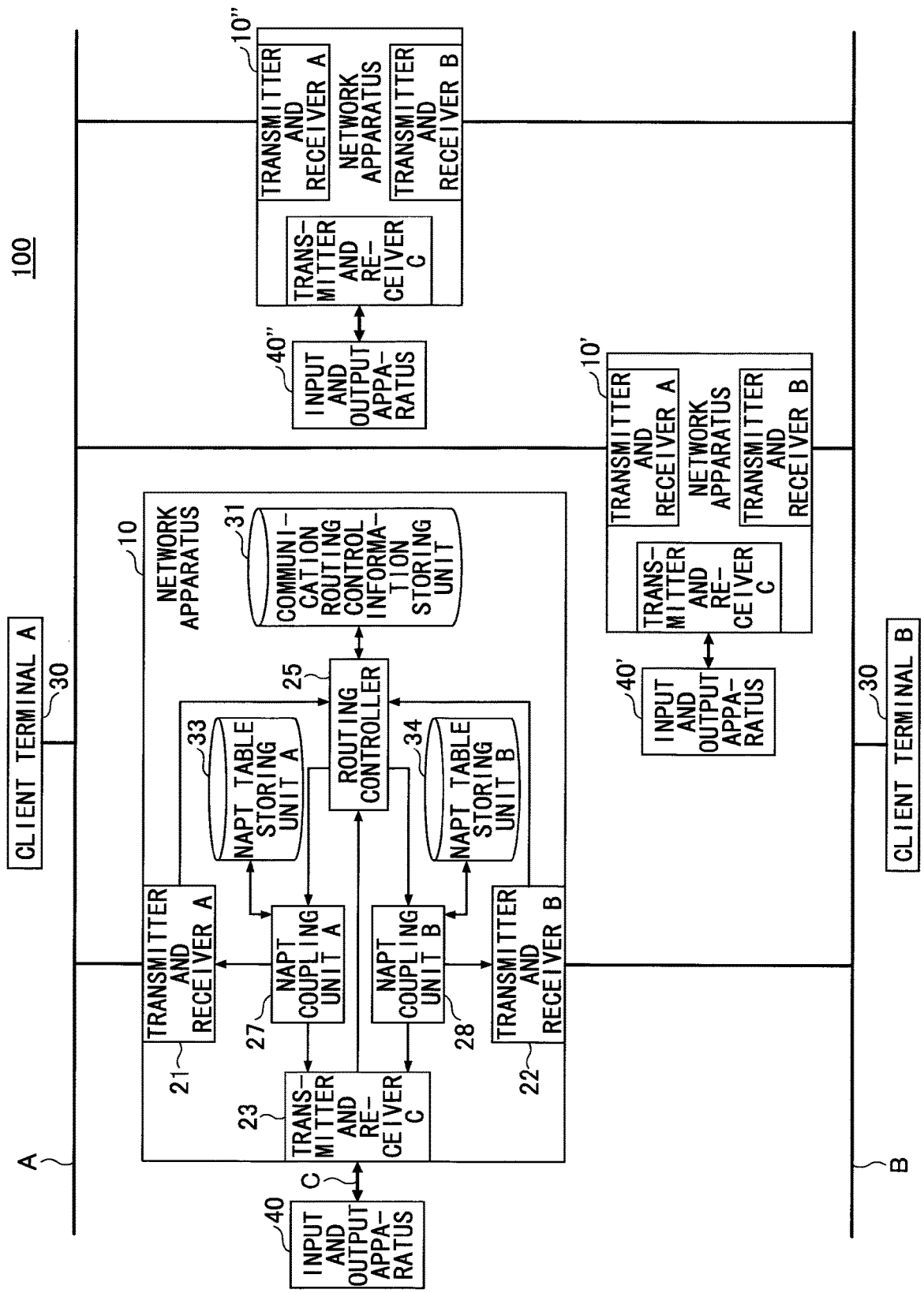

[Fig. 14]
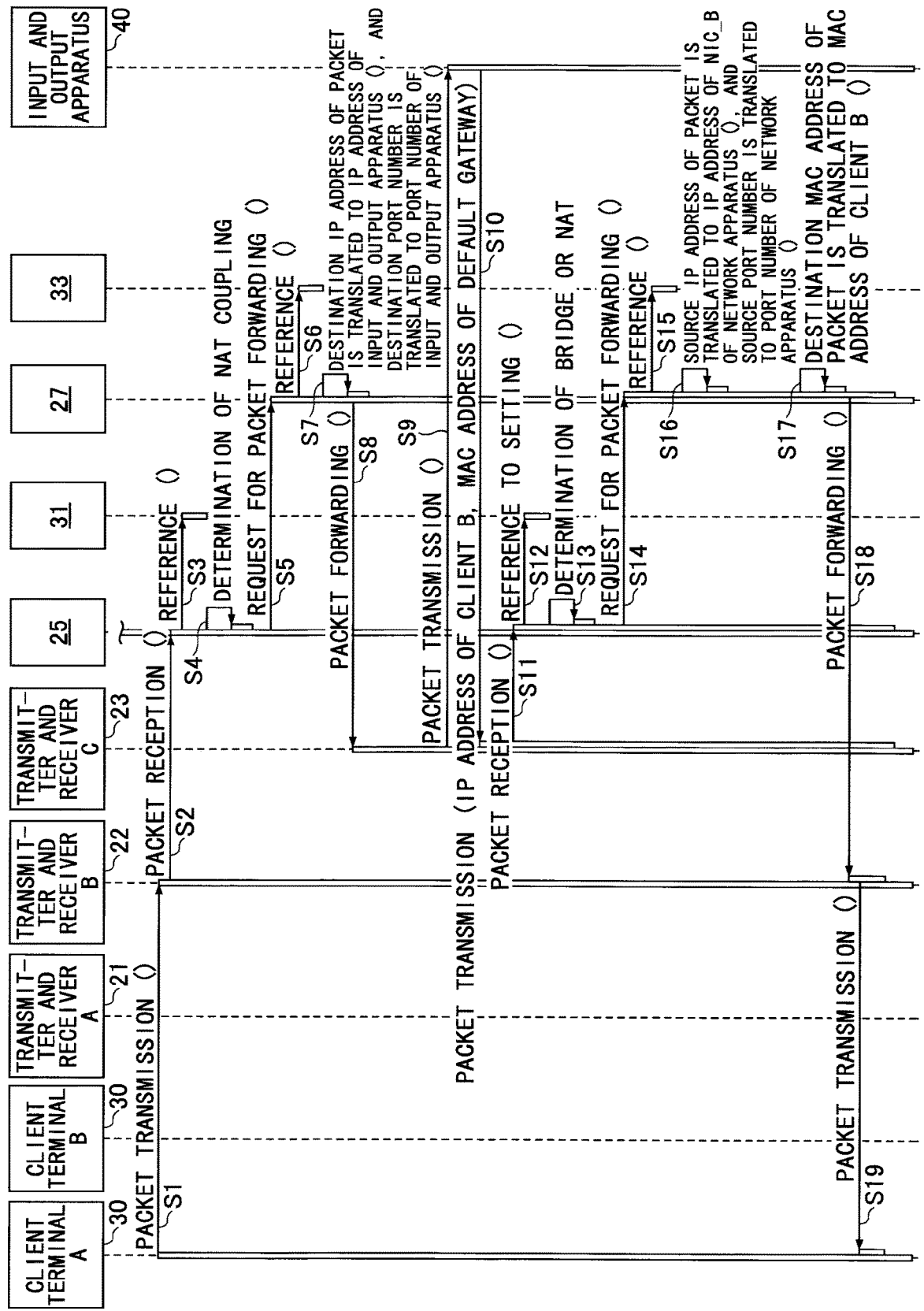

[Fig. 15A]
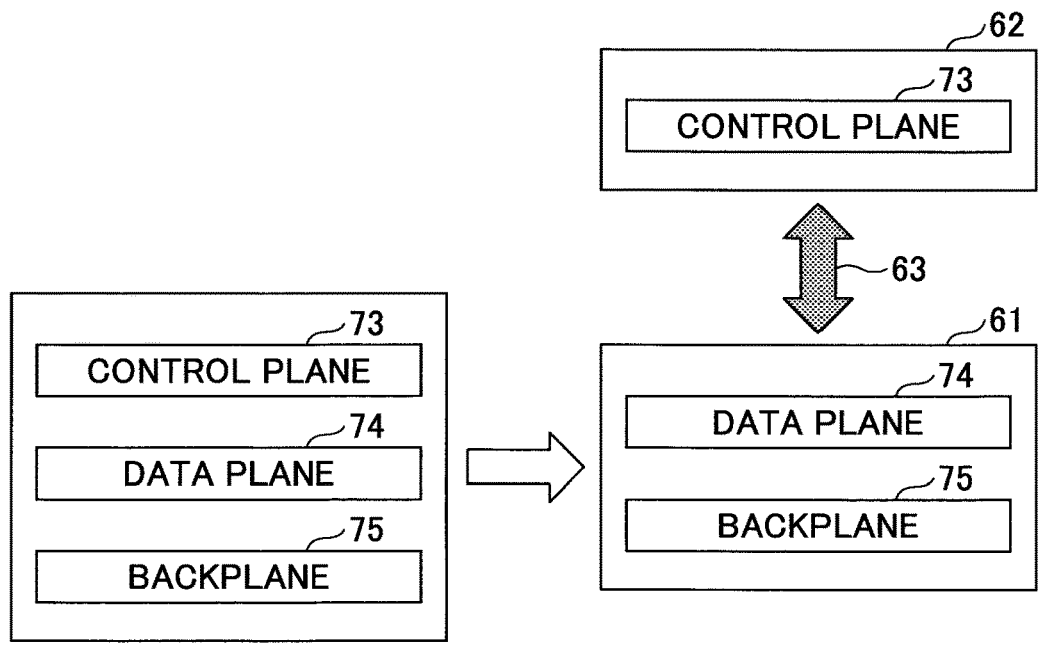
[Fig. 15B]
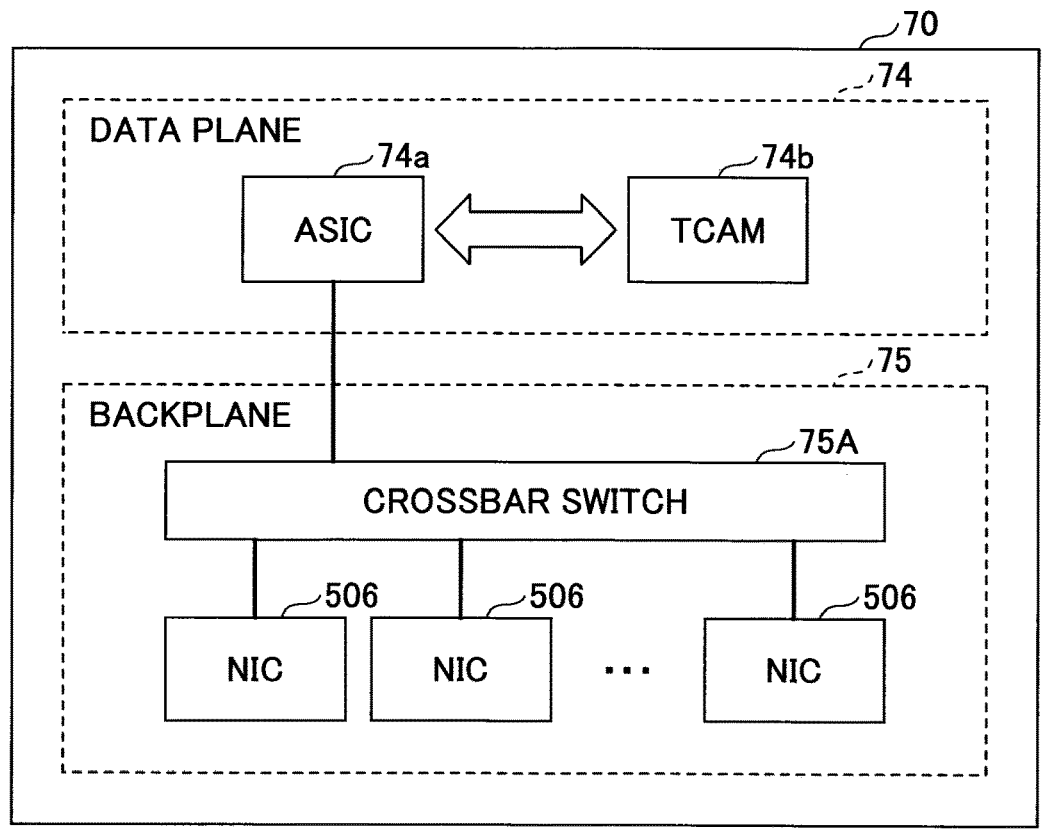

[Fig. 16]
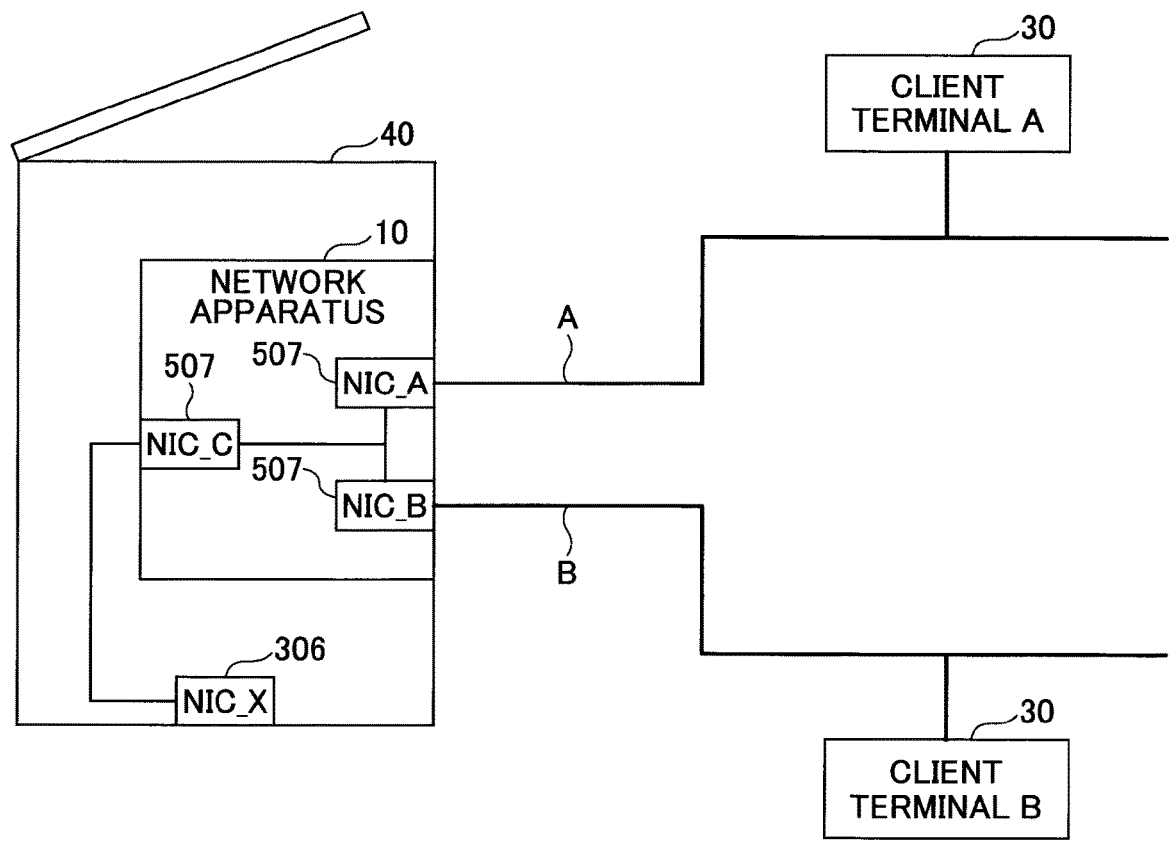

NETWORK APPARATUS, INPUT AND OUTPUT APPARATUS, AND PROGRAM

TECHNICAL FIELD

The disclosure herein generally relates to a network apparatus, an input and output apparatus, and a program.

BACKGROUND ART

Presence of different networks (network addresses are different) in a same organization is not a rare situation. Hosts in different networks are usually capable of communicating with each other via a router. However, in some cases, intercommunication between the different networks is desired to be limited even in the same organization. For example, in a public office or a hospital, there are two different types of networks including: a first network through which information that should be kept secret flows, such as private information; and a second network for an Office Automation (OA) system through which information whose secrecy is not as high as the private information flows, such as sales data or personnel data. Also in private-sector companies, owing to mergers-and-acquisitions (M&A), in some cases, members from originally different enterprises work on the same floor and use different networks (e.g., an enterprise A uses the first network and an enterprise B uses the second network).

In the above cases, the information flowing through the first network should not flow into the second network, and the information flowing through the second network should not flow into the first network.

Additionally, input and output apparatuses such as printers are often used in business activities in public offices, hospitals, and private-sector companies. However, in a case where input and output apparatuses are provided for the respective networks, large burdens are applied on the organizations and installation spaces are also needed for the number of input and output apparatuses. Hence, there is a demand for reducing the number of input and output apparatuses by using a common input and output apparatus.

In order to meet such a demand, an input and output apparatus with a plurality of network interfaces is known (e.g., see Patent Document 1). Patent Document 1 discloses an image-forming apparatus with a plurality of network interfaces respectively coupled with a plurality of network segments. The image-forming apparatus controls communication between each of the plurality of network interfaces and another apparatus in accordance with communication propriety setting means that are set for the image-forming apparatus with respect to proprieties for communicating between the plurality of network interfaces and other apparatuses.

CITATION LIST

Patent Literature

[PTL 1] Japanese Unexamined Patent Application Publication No. 2005-229332

SUMMARY OF INVENTION

Technical Problem

In a case where different networks are coupled with the input and output apparatus as disclosed in PTL 1, however, there is concern that information might leak between the different networks via the input and output apparatus. For example, the first network and the second network are designed individually, and there is likelihood that different apparatuses have identical IP addresses. Since most of the input and output apparatuses each have only one routing table, in a case where the apparatuses having such identical IP addresses are within a range where IP communication is available, various inconveniences might occur in an ARP request or in a TCP connection establishment. Even without such an inconvenience, information leakage might occur such that the information that should be transmitted to the first network is transmitted to the second network.

IP addresses can be re-assigned to eliminate identical IP addresses being assigned to different apparatuses. However, in this case, at least two network interfaces are needed. Further, a router can be provided for separating the first network and the second network from each other. However, in a case where transmission data includes a destination having an IP address that allows the transmission data to pass through such a router, information will flow between the first network and the second network.

The present disclosure has an object of providing a network apparatus capable of preventing information leakage between different networks, and enabling shared use of an input and output apparatus between the different networks.

Solution to Problem

According to one aspect of the present invention, a network apparatus includes: a plurality of network interfaces; a first communication unit configured to communicate with an input and output apparatus in a first network with which a first network interface of the plurality of network interfaces is coupled; a second communication unit configured to communicate with a first device in a second network with which a second network interface of the plurality of network interfaces is coupled; and a third communication unit configured to communicate with a second device in a third network with which a third network interface of the plurality of network interfaces is coupled. When the second communication unit receives data from the second network, the data is transmitted to the first network through the first communication unit without being transmitted to the third network. When the third communication unit receives data from the third network, the data is transmitted to the first network through the first communication unit without being transmitted to the second network.

Advantageous Effects of Invention

According to one aspect of the present invention, a network apparatus is capable of preventing information leakage between different networks, and enables shared use of an input and output apparatus between the different networks.

BRIEF DESCRIPTION OF DRAWINGS

FIG. 1 is a diagram schematically illustrating operations of a network apparatus in the present embodiment, as one example.

FIG. 2 is a diagram illustrating a network system where communication routes are controlled by the network apparatus, as one example.

FIG. 3 is a hardware configuration diagram of the network apparatus, as one example.

FIG. 4 is a hardware configuration diagram of a multi-function peripheral serving as an input and output apparatus, as one example.

FIG. 5 is a diagram schematically illustrating part of functionality operated by the network apparatus, as one example.

FIG. 6 is a diagram illustrating an OpenFlow architecture, as one example.

FIG. 7A is a sequence diagram illustrating processes, as one example, when a client terminal A in a network A and a client terminal B in a network B communicate with the input and output apparatus.

FIG. 7B is a sequence diagram illustrating processes, as one example, when the client terminal A in the network A and the client terminal B in the network B communicate with the input and output apparatus.

FIG. 8 is a configuration diagram of a network system, as one example.

FIG. 9A illustrates a sequence diagram illustrating processes, as one example, when the client terminal A in the network A and the client terminal B in the network B communicate with the input and output apparatus 40, in a case where a default gateway is coupled with the network A.

FIG. 9B illustrates a sequence diagram illustrating processes, as one example, when the client terminal A in the network A and the client terminal B in the network B communicate with the input and output apparatus 40, in the case where the default gateway is coupled with the network A.

FIG. 10 is a configuration diagram of a network system, as a comparative example, in a case where a network apparatus controls communication routes.

FIG. 11 is a diagram schematically illustrating operations performed by the network apparatus, as a working example 2.

FIG. 12 is a diagram illustrating a network system where communication routes are controlled by the network apparatus, as one example.

FIG. 13 is a diagram schematically illustrating part of functionality operated by the input and output apparatus, as one example.

FIG. 14 is a sequence diagram illustrating communication between the client terminal A in the network A and the input and output apparatus, as one example.

FIG. 15A is a diagram illustrating a configuration of the network apparatus, as one example.

FIG. 15B is a diagram illustrating a configuration of the network apparatus, as one example.

FIG. 16 is a diagram illustrating the input and output apparatus including the network apparatus, as one example.

DESCRIPTION OF EMBODIMENTS

In the following, embodiments of the present invention will be described with reference to the accompanying drawings.

Working Example 1

FIG. 1 illustrates a general operation of a network apparatus 10 in the present embodiment, as one example. In FIG. 1, a client terminal 30 (hereinafter, referred to as client terminal A) is coupled with a network A, and another client terminal 30 (hereinafter, referred to as client terminal B) is coupled with a network B. The networks A and B are coupled with the network apparatus 10, but the network apparatus 10 does not establish communication from the network A to the network B or communication from the network B to the network A, as will be described later.

The network apparatus 10 is coupled with an input and output apparatus 40 such as a printer. The network apparatus 10 recognizes the input and output apparatus 40 as an apparatus coupled with the network A. That is, the input and output apparatus 40 is in the network A, which is different from the network B coupled with the client terminal B. In such a configuration, the following communication routing control processes are enabled.

(i) Packets that are transmitted from the client terminal A are directly transmitted to the input and output apparatus 40 that is in the same network A with the client terminal A.

(ii) Packets that are transmitted from the client terminal B are transmitted via the network apparatus 10 to the input and output apparatus 40, which means passing through a router. In the present embodiment, Network Address Translation (NAT) is performed in a reversed direction of a typical NAT. By performing a reversed NAT, destination IP addresses of packets to be transmitted to the input and output apparatus 40 are translated to the IP address of the input and output apparatus 40 from the IP address of the network apparatus 10.

In response to packets that have been transmitted to the input and output apparatus 40 from the client terminals A and B, the input and output apparatus 40 transmits packets to the network apparatus 10. Regarding the packets that have been transmitted by the input and output apparatus 40 to the client terminals A and B, the network apparatus 10 determines a destination of each of the packets and transmits each of the packets to the network A or B.

(iii) When the input and output apparatus 40 responds to the client terminal A, the input and output apparatus 40 transmits a packet to the client terminal A as a destination, because network addresses of the input and output apparatus 40 and the client terminal A are the same. In other words, the destination includes the MAC address of the client terminal A and IP address of the client terminal A. The network apparatus 10 directly transmits the packet to the network A without change, because the MAC address of the destination is not the MAC address of the network apparatus 10. Alternatively, the network apparatus 10 determines from the destination IP address and a subnet mask of the network A that the packet is to be transmitted to the network A, and directly transmits the packet to the network A without change.

(iv) When the input and output apparatus 40 responds to the client terminal B, the input and output apparatus 40 transmits a packet with the destination set to the network apparatus 10, which is a default gateway, because the network address of the input and output apparatus 40 is different from the network address of the client terminal B. In other words, the destination includes MAC address of the network apparatus 10 and IP address of the client terminal B. The network apparatus 10 determines that the destination MAC address is the network apparatus 10, refers to a NAT table, and translates and rewrites a source IP address from the input and output apparatus 40 to the IP address of the network apparatus 10. Additionally, the destination MAC address is translated to the MAC address of the client terminal B. Accordingly, the destination includes the MAC address of the client terminal B and IP address of the client terminal B.

In accordance with the above processes, the client terminal A in the network A and the client terminal B in the network B, which is a different network from the network A, are capable of sharing a common input and output apparatus 40. The input and output apparatus 40 is coupled with the network A, and the packet to be transmitted to the network A from the input and output apparatus 40 is directly transmitted to the network A. Hence, there is almost no likelihood of information leakage. The packets to be transmitted to the network B from the input and output apparatus 40 are transmitted via the network apparatus 10 to the network B. Hence, there is almost no likelihood of information leakage. Additionally, since the packet transmission from the network A to the network B is not performed, there is no likelihood that the packets leak from the network A to the network B. Since the packet transmission from the network B to the network A is not performed, there is no likelihood that the packets leak from the network B to the network A.

Here, it is assumed that the client terminal A and the client terminal B have identical IP addresses. When the input and output apparatus 40 responds to the packets that have been transmitted from the client terminal A, the destination MAC address is the address of the client terminal A and thus the packets are transmitted to the client terminal A only. When the input and output apparatus 40 responds to the packets that have been transmitted from the client terminal B, the destination MAC address is the address of the network apparatus 10 and thus the network apparatus 10 forwards the packets to the client terminal B. Therefore, there is no or almost no likelihood that the information leaks between the networks A and B.

In the present embodiment, no description will be given of a process for a case where the input and output apparatus 40 starts communication with the client terminal A or with the client terminal B. An example of the communication that the input and output apparatus 40 starts is communication when the input and output apparatus 40 reads (scans) a manuscript and transmits created image data to the client terminal A or to the client terminal B. Such a function is called SCAN to Folder, but no description will be given of SCAN to Folder in the present embodiment.

<Regarding Terms>

"Directly transmitting" may denote transmission of packets as they are, or no change is made to the packets. To be specific, no change is made to a MAC address, which is a Layer-2 address, or an IP address, which is a Layer-3 address.

"Address information" may include information for identifying an apparatus on a network, or information used by a network apparatus to forward data to a destination apparatus on a network. To be specific, the address information includes IP address, MAC address, and port number.

"Data" may be information that flows on a network, and may be called packet or frame, for example.

<Additional Description of System Configuration>

The system configuration will be described further with reference to FIG. 2. FIG. 2 is a configuration diagram of a network system 100 in which the network apparatus 10 controls communication routes, as one example. In FIG. 2, in order to facilitate understanding the following description, IP addresses and subnet masks are illustrated. In addition, an IP address is written, followed by the last two digits of a MAC address in parentheses.

The IP address of the input and output apparatus 40 is 165.96.10.11. The IP address of the client terminal A is 165.96.10.01. The IP address of the client terminal B is 192.168.5.01. The network apparatus 10 includes three Network Interface Cards (NICs) 507. 165.96.10.200 is the IP address of a NIC_A coupled with the network A. 192.168.5.100 is the IP address of a NIC_B coupled with the network B. NIC_C that is coupled with a network C does not have an IP address. This is because the NIC_C of the network apparatus 10 that is coupled with the network C can simply provide a communication interface. The NIC_C can be considered to be the same as, for example, a hub or a LAN switch (simply for communication control in layer 2 or lower). The input and output apparatus 40 does not communicate through the network C with the IP address of the NIC_C as a destination (The NIC_C coupled with the network C does not need to have an IP address).

The same reasoning also applies to the NIC_A coupled with the network A. However, the NIC_A having the IP address brings advantages to be described later (see FIG. 8, FIG. 9A, and FIG. 9B). The subnet mask of the network A is 165.96.10.0/24, and the subnet mask of the network B is 192.168.5.0/24.

The network apparatus 10 may include at least three NICs, and an upper limit number can be determined depending on the throughput of the network apparatus 10 or installation spaces of the NICs. For example, in a case where the network apparatus 10 includes four NICs, one input and output apparatus 40 can be shared by three different networks.

The network apparatus 10 and the input and output apparatus 40 may be connected with each other by cable or via a wireless LAN (e.g., Wi-Fi), for example. The network A may include a wireless LAN access point so that the client terminal A can communicate wirelessly with such a wireless LAN access point. The network B may include a wireless LAN access point so that the client terminal B can communicate wirelessly with such a wireless LAN access point.

The input and output apparatus 40 may be, for example, a complex machine that enables, in a single body, a plurality of functions including a printing function, a copying function, a scanning function, and a facsimile function. The complex machine can be referred to as a multifunction peripheral (MFP) or a copier. The input and output apparatus 40 may include only one of the printing function, the copying function, the scanning function, or the facsimile function. In such a case, the input and output apparatus 40 may be referred to as a printer, a copier, a scanner, or a facsimile apparatus. In addition to the complex machine, the input and output apparatus 40 may be a whiteboard, a projector, or a video conference terminal. Users are able to share the above-described apparatuses from the networks A and B. Information used by the whiteboard, the projector, or the video conference terminal can be transmitted to the networks A and B.

The client terminals A and B may be information processing devices connectable to the networks A and B. Examples of the client terminals A and B may include, but are not limited to, personal computers (PCs), smartphones, tablet computers, Personal Digital Assistants (PDAs), and mobile telephones. In addition to the above devices, the client terminals A and B may be wearable devices (such as head-up displays or wristwatch-type terminals), digital cameras, or game machines, as long as the devices have functions of a communication device and of an information processing device.

The network apparatus 10 enables communication through networks from both the client terminals A and B. The network apparatus 10 prevents packets transmitted from the input and output apparatus 40 to the client terminal A from being transmitted to the client terminal B, and prevents packets transmitted from the input and output apparatus 40 to the client terminal B from being transmitted to the client terminal A. The network apparatus 10 may be an information processing device, specifically. Note that the client terminal B views the network apparatus 10 as the input and output apparatus 40. The client terminal B learns that the NIC_B of the network apparatus 10 is assigned with a computer name that is the same with a computer name of the input and output apparatus 40, and by using the computer name, an OS or a printer driver of the client terminal B views the network apparatus 10 as the input and output apparatus 40. A master browser on a network manages the computer names, and the client terminal B is capable of acquiring the computer name of the network apparatus 10. When the client terminal B makes an inquiry to the network apparatus 10 about the computer name serving as the destination in a communication protocol named Server Message Block (SMB), the client terminal B is capable of acquiring the IP address of the network apparatus 10 (name resolution). Accordingly, when the client terminal B starts communication with the input and output apparatus 40, the destination IP address is 192.168.5.100, which is the IP address of the NIC_B. Note that in addition to the above-described mechanism, the name resolution can be performed by using a Domain Name System (DNS).

Note that the NIC_A of the network apparatus 10 is not assigned with the computer name that is the same with the computer name of the input and output apparatus 40. The network A and the network C are in the same network, and thus the NIC_A and the NIC_C provide communication interfaces in a similar manner to a Layer-2 switch. Therefore, the client terminal A views the network apparatus 10 as a communication route, and views the input and output apparatus 40 as a printer, for example.

In a case where one set is configured by the network apparatus 10 and the input and output apparatus 40, the networks A and B are respectively coupled with two more sets. A network apparatus 10' and an input and output apparatus 40' form another set, and a network apparatus 10" and an input and output apparatus 40" form further another set. Four or more sets are connectable with the networks A and B.

The IP address of the input and output apparatus 40' is 165.96.10.12, the IP address of the NIC_A of the network apparatus 10' is 165.96.10.201, and the IP address of the NIC_B of the network apparatus 10' is 192.168.5.101. Therefore, the input and output apparatus 40' and the NIC_A of the network apparatus 10' are in the network A, whereas the NIC_B of the network apparatus 10' are in the network B.

The IP address of the input and output apparatus 40" is 165.96.10.13, the IP address of the NIC_A of the network apparatus 10" is 165.96.10.202, and the IP address of the NIC_B of the network apparatus 10" is 192.168.5.102. Therefore, the input and output apparatus 40" and the NIC_A of the network apparatus 10" are in the network A, whereas the NIC_B of the network apparatus 10" is in the network B.

By connecting the sets of the network apparatus 10 and the input and output apparatus 40 with the networks A and B in this manner, an appropriate number of input and output apparatuses 40 can be provided even when the number of the client terminals A and B increase. A processing load of the network apparatus 10 is less likely to be increased. An input and output apparatus 40 for priority use (a default input and output apparatus 40) is set for each of the client terminals A and B. In the following, operations of the network apparatus 10 and the input and output apparatus 40 will be described, unless otherwise specified. However, the set of the network apparatus 10' and the input and output apparatus 40' and the set of the network apparatus 10" and the input and output apparatus 40" have the same operations.

Note that each of the network apparatuses 10, 10', and 10" may use a predetermined one of the input and output apparatuses 40, 40', and 40". However, in a case where the network system 100 includes a load balancer, such a load balancer may select any one of the input and output apparatuses 40, 40', and 40", according to the loads applied to the input and output apparatuses 40, 40', and 40".

<Hardware Configuration>

FIG. 3 is a hardware configuration diagram of the network apparatus 10 in the present embodiment, as one example. The network apparatus 10 includes an input device 501, a display device 502, an external I/F 503, a RAM 504, a ROM 505, a CPU 506, NICs 507, and a HDD 508, which are coupled with each other via a bus B. Note that the input device 501 and the display device 502 may be coupled and used as appropriate.

The input device 501 may include a keyboard, a mouse, or a touch panel, so that users can input various operation signals. The display device 502 may include a display to display a processing result of the network apparatus 10.

The NICs 507 may be interfaces for coupling the network apparatus 10 to the networks A to C. The NICs 507 may be communication devices to couple the network apparatus 10 to the LAN. Each of the NICs 507 may also be called a network card. To be specific, Ethernet (registered trademark) cards are known. The NICs 507 may be detachable, may be secured at the network apparatus 10, or may be externally attached to the network apparatus 10. In this case, the NICs 507 and the network apparatus 10 may be coupled by USB cables or IEEE 1394 cables. In FIG. 3, three NICs 507 are illustrated, but four or more NICs 507 can be provided. The number of NICs 507 can be determined depending on the number of different networks, from which the input and output apparatus 40 is shared, or the capability of the CPU 506.

The HDD 508 is one example of a non-volatile memory device for storing programs and data. The programs and data to be stored may include an OS that is basic software for controlling the entire network apparatus 10, and application software (hereinafter, simply referred to as application) for providing various functions on the OS. Instead of the HDD 508, a driving device (e.g., Solid-State Drive: SSD) that uses a flash memory as a recording medium may be used.

The external I/F 503 may be an interface with an external apparatus. The external apparatus may include a recording medium 503a, for example. This enables the network apparatus 10 to write and/or read data through the external I/F 503 into and from the recording medium 503a. Examples of the recording medium 503a may include, but are not limited to, a flexible disk, an optical disk such as a CD or a DVD, an SD memory card, and a USB memory.

The ROM 505 is one example of a non-volatile semiconductor memory (memory device) capable of holding programs and data, even when the ROM 505 is powered off. The ROM 505 stores programs and data related to the BIOS that is performed when the network apparatus 10 starts up, OS settings, and network settings. The RAM 504 is one example of a volatile semiconductor memory (memory device) that temporarily stores programs and data (packets).

The CPU 506 is an operating device that reads the programs and data from memory devices such as the ROM 505 and the HDD 508 and that performs processes to enable control and functionality of the entire network apparatus 10.

The hardware configuration of the network apparatus 10 illustrated in FIG. 3 is not necessarily accommodated in a single body, or is not necessarily provided as a single apparatus. The hardware configuration of the network apparatus 10 illustrated in FIG. 3 may include hardware components that can be included in the network apparatus 10. In order to support cloud computing, a physical configuration of the network apparatus 10 in the present working example is not necessarily fixed. The network apparatus 10 may be configured such that a hardware resource is dynamically coupled to or decoupled from the network apparatus 10 in accordance with a processing load.

FIG. 4 is a hardware configuration diagram of the input and output apparatus 40 serving as a multifunction peripheral, as one example. The input and output apparatus 40 may include a controller 320. The controller 320 may include a CPU 301, an Application Specific Integrated Circuit (ASIC) 305, an SDRAM 302, a flash memory 303, an HDD 304, and a NIC_X 306.

The ASIC 305 may be a multifunctional device board including a CPU interface, an SDRAM interface, a local bus interface, a PCI bus interface, a Media Access Controller (MAC), and a HDD interface.

The CPU 301 may read various programs via the ASIC 305 from the HDD 304, and may run such various programs.

The SDRAM 302 may function as a program memory for storing the various programs and may also function as a working memory used when the CPU 301 implements various programs. Note that instead of the SDRAM 302, a DRAM or SRAM may be used.

The flash memory 303 may be a non-volatile flash memory for storing a boot loader (boot program) or the OS that starts up the multifunction peripheral. The flash memory 303 may also function as an application memory for storing the programs. The flash memory 303 may function as a service memory for storing software for services (i.e., a copy service, a print service, and a facsimile service). The flash memory 303 may also function as a firm memory for storing firmware or as a data memory for storing a network address, a device type, and a device number.

Note that instead of the flash memory 303, a non-volatile RAM in which a backup circuit using a RAM and a battery is integrated or another type of non-volatile memory such as an Electrically Erasable Programmable Read-Only Memory (EEPROM) may be used.

The HDD 304 is a non-volatile recording medium for recording data regardless of power-on or power-off of the multifunction peripheral. The HDD 304 records programs and data other than the programs and data recorded in the flash memory 303. The HDD 304 may be used as a firm memory.

The NIC_X 306 may operate in a similar manner to the network interface card included in the network apparatus 10. To be specific, using the NIC_X 306, the network apparatus 10 communicates with the network apparatus 10 through the network C. A controller 320 is coupled with an operation panel 307. The operation panel 307 includes various operation keys, a Liquid crystal display (LCD) or a character indicator of a CRT serving as a display device, and a touch panel, which are used by a user 9 to input various instructions on the multifunction peripheral.

Additionally, the controller 320 is coupled through a PCI bus 330 to a facsimile control unit 308, a USB 309 to which a recording medium 309a is attachable, an IEEE 1394 (310), a plotter engine 311, a scanner engine 312, and a BLE module 313. This configuration enables the multifunction peripheral to provide various services such as the copy service, the print service, and the facsimile service. The plotter engine 311 may adopt either one of an electrophotographic method or an inkjet method.

The illustrated configuration is simply one example and the hardware configuration of the multifunction peripheral is not limited to the configuration illustrated in FIG. 4. For example, the NIC_X 306 may be coupled to the PCI bus 330. The NIC_X 306 may be coupled to the network N by cable, or may be coupled wirelessly to the network N via a wireless LAN, for example. A plurality of NIC_Xs 306 may be provided.

Instead of the NIC_X 306 or together with the NIC_X 306, a Digital Service Unit (DSU) or a modem to be coupled to a telephone network may be included. A communication device to be coupled to a mobile telephone network may be included.

<Functionality of Network Apparatus>

Next, functionality of the network apparatus will be described with reference to FIG. 5. FIG. 5 is a schematic diagram illustrating part of functionality operated by the network apparatus, as one example. The network apparatus 10 includes: a transmitter and receiver 21 (hereinafter, transmitter and receiver A) configured to receive packets from the network A and configured to transmit packets to the network A; a transmitter and receiver 22 (hereinafter, transmitter and receiver B) configured to receive packets from the network B and configured to transmit packets to the network B; and a transmitter and receiver 23 (hereinafter, transmitter and receiver C) configured to receive packets from the network C and configured to transmit packets to the network C. The transmitters and receivers A to C are functions or units achieved by the CPU 506 of the network apparatus 10 performing programs to control the NICs 507, for example.

The network apparatus 10 further includes: a bridge coupling unit 24; a NAT coupling unit 26; and a routing controller 25. The bridge coupling unit 24, the NAT coupling unit 26, and the routing controller 25 are functions or units achieved by the CPU 506 of the network apparatus 10 performing programs to control various types of hardware illustrated in FIG. 3.

The routing controller 25 requests the bridge coupling unit 24 or the NAT coupling unit 26 to forward the received packet, mainly depending on which one of the transmitters and receivers A and B has received the packet. In addition, in a case where the transmitter and receiver C has received the packet, the routing controller 25 requests the bridge coupling unit 24 or the NAT coupling unit 26 to forward the received packet, depending on a MAC address of a destination, for example. To make these determinations, the routing controller 25 refers to communication routing control information in a communication routing control information storing unit 31 achieved by the RAM 504 and the HDD 508, for example, in FIG. 3.

TABLE 1

| Network interface name | Subnet mask | IP address | Coupled network | Forwarding method |
|---|---|---|---|---|
| NIC_A | 165.96.10.0/24 | 165.96.10.200 | Network A | Bridge with network C |
| NIC_B | 192.168.5.0/24 | 192.168.5.100 | Network B | NAT with network C |
| NIC_C | — | — | Network C | Destination MAC address: Other than network apparatus 10 Bridge with network A, Destination MAC address: Network apparatus 10 NAT with network B |

Table 1 indicates the communication routing control information, as one example. In the communication routing control information, for each of the network interfaces A to C, a subnet mask, an IP address, a coupled network, and a forwarding method are registered. The "network interface name" indicates identification information for identifying the network interfaces A to C. The "IP address" indicates IP addresses that have been assigned to the NIC_A and the NIC_B. As described above, no IP address is assigned to the NIC_C. The "coupled network" indicates identification information of a network coupled with each of the network interfaces A to C. The "forwarding method" registers which one of the bridge coupling unit 24 or the NAT coupling unit 26 the packets received by the NIC_A to the NIC_C are to be forwarded.

According to Table 1, the NIC_A is registered such that the NIC_A has the IP address 165.96.10.200, is coupled with the network A, and forwards the packets to the network C in a bridge method. The NIC_B is registered such that the NIC_B has the IP address 192.168.5.100, is coupled with the network B, and forwards the packets to the network C in a NAT method. The NIC_C is registered such that the NIC_C has no IP address, is coupled directly to the input and output apparatus 40, is coupled in a bridge method with the network A in a case where the destination MAC address is not the network apparatus 10, and is coupled in a NAT method with the network B in a case where the destination MAC address is the network apparatus 10.

Network administrators are able to set, change, and delete the communication routing control information. For example, the network administrators are able to set the IP addresses, the subnet masks, and the forwarding method at appropriate values suited for the respective networks A to C. This configuration enables a flexible response to a change in a network operation made by a user.

Referring to the communication routing control information, the routing controller 25 controls the packets as follows.

When the transmitter and receiver A receives a packet, the routing controller 25 forwards the packet to the bridge coupling unit 24.

When the transmitter and receiver B receives a packet, the routing controller 25 forwards the packet to the NAT coupling unit 26.

When the transmitter and receiver C receives a packet and the destination MAC address is not the network apparatus 10, the routing controller 25 forwards the packet to the bridge coupling unit 24. In a case where the destination MAC address is the network apparatus 10, the routing controller 25 forwards the packet to the NAT coupling unit 26. Note that the routing controller 25 may determine the destination network depending on the destination IP address. For example, in a case where the destination IP address has the network address of the network A, the routing controller 25 forwards the packet to the bridge coupling unit 24. In a case where the destination IP address has the network address of the network B, the routing controller 25 forwards the packet to the NAT coupling unit 26. However, the determination with the destination MAC address easily controls the communication route in a suitable manner, even in a case where the client terminals A and B have identical IP addresses.

The bridge coupling unit 24 may have a relay function for relaying packets at a data link layer (Layer 2) of the Open Systems Interconnection (OPI) model (more specifically, a relay function for relaying Ethernet (registered trademark) frames). The bridge coupling unit 24 is configured to record a MAC address of a packet transmitted from the network A in a MAC address table, and to record a MAC address of a packet transmitted from the network C in the MAC address table.

TABLE 2

| Network interface name | MAC address |
|---|---|
| NIC_A (XX: XX: XX: XX: XX: AI) | XX: XX: XX: XX: XX: AA (Client terminal A) |
| NIC_C (XX: XX: XX: XX: XX: CI) | XX: XX: XX: XX: XX: XX (Input and output apparatus) |

Table 2 indicates a MAC address table, as one example. In association with the NIC_A for the network A and the NIC_C for the network C, the MAC addresses of the client terminals A and B in the networks A and B that are respectively coupled with the NIC_A and the NIC_B are registered in the MAC table.

In a case where a packet in which the destination MAC address is set to an apparatus in the network C is transmitted from the network A, the bridge coupling unit 24 refers to the MAC address table, detects that the apparatus having the MAC address is coupled with the network C, and directly transmits the packet to the network C without change. In the present embodiment, the apparatus in the network C is the input and output apparatus 40. The reverse case is handled similarly. In a case where a packet in which the destination MAC address is set to an apparatus in the network A is transmitted from the network C, the bridge coupling unit 24 refers to the MAC address table, detects that the apparatus having the MAC address is coupled with the network A, and directly transmits the packet to the network A without change.

The bridge function may be a function for controlling the transmission destination of data in accordance with the MAC address in one-to-one connection (in the above case, the input and output apparatus 40 and the client terminal A). The bridge function is similar to the function of a hub or a Layer-2 switch configured to control the transmission destination of data in accordance with the MAC address in one-to-n connections or in n-to-n connections.

The NAT coupling unit 26 may have a function for mutually translating an IP address of a packet at an IP Layer (Layer 3) of the OSI model. The network apparatus 10 may include a NAT table storing unit 32 achieved by the RAM 504 and the HDD 508 in FIG. 3. The NAT table is stored in the NAT table storing unit 32.

TABLE 3

| IP address before translation | IP address after translation |
|---|---|
| 192.168.5.100 (Network apparatus) | 165.96.10.11 (Input and output apparatus) |

Table 3 indicates the NAT table, as one example. In the NAT table, an IP address before translation is associated with an IP address after translation. The IP address before translation is the IP address of the network apparatus 10 and the IP address after translation is the IP address of the input and output apparatus 40 (because the client terminal B sets the network apparatus 10 as a destination).

When a packet with the destination IP address set to the network apparatus 10 is transmitted from the client terminal B in the network B (a source IP address is set to the IP address of the client terminal B), the NAT coupling unit 26 refers to the NAT table and translates the destination IP address of the packet to the IP address of the input and output apparatus 40. In response to this packet, when a packet with the destination IP address set to the IP address of the client terminal B is transmitted from the input and output apparatus 40, the NAT coupling unit 26 refers to the NAT table, translates the source IP address to the IP address of the network apparatus 10 from the IP address of the input and output apparatus 40, and transmits the translated packet to the network B.

In the present working example, the NAT translation is described as one example, but Network Address Port Translation (NAPT) may be adopted. In other words, together with an IP address, a port number may be translated. Note that the NAPT is also called an IP masquerade or NAT+ (NAT plus).

<Specific Implementation Method of Network Apparatus>

In some network systems, apparatuses each having a predetermined function, such as a hub, a switch, a router, a firewall, etc., are arranged for implementation. In a case where a network configuration needs to be changed, network administrators need to change settings of the related apparatuses or need to change connections of the apparatuses. In contrast to such network systems, Software-Defined Networking (SDN) is known as an idea (a concept) of designing network architectures or functions on a software basis. Additionally, OpenFLow is known as a specific mechanism for enabling the SDN.

FIG. 6 is a diagram illustrating an OpenFlow architecture, as one example. The OpenFlow architecture mainly includes: an OpenFlow controller 62 configured to control routing; an OpenFlow switch 61 configured to have a data forwarding function; and an OpenFlow protocol 63 configured to define a communication method between the OpenFlow switch 61 and the OpenFlow controller 62. The OpenFlow controller 62 is achieved by software and the OpenFlow switch 61 is achieved by software or hardware.

The OpenFlow controller 62 may define a group of rules including a plurality of entries as a "Flow Table", in which each of the entries includes a condition and an action for a packet to be controlled by the OpenFlow controller 62. The OpenFlow controller 62 may write the Flow Table into the OpenFlow switch 61 in accordance with the OpenFlow protocol 63. Various fields in a packet, such as a port number, a MAC address, and an IP address can be used for the condition. In the Flow Table, an action associated with a condition is defined, such that when a packet matches the condition, such a matched packet is output from a given port, a field in the packet is overwritten, or a packet is dropped, for example.

The OpenFlow switch 61 is configured to control each packet in accordance with the Flow Table that has been written. When an output port is to be controlled in accordance with the Flow Table, the OpenFlow switch 61 operates as a Layer-2 switch. When a port is controlled with an IP address or an IP address translation is controlled, the OpenFlow switch 61 operates as a router. By dropping certain packets, the OpenFlow switch 61 operates as a firewall.

The OpenFlow switch 61 is also configured to control each of the packets in accordance with the Flow Table that has been written, and is thus capable of handling the packets without communicating with the OpenFlow controller 62.

Also in the present embodiment, the OpenFlow controller 62 is configured to define the Flow Table such that the network apparatus 10 operates as a bridge for handling the packets from the network A and the packets from the network C to the client terminal A. In the OpenFlow switch 61, the routing controller 25 is configured to determine whether the condition matches a packet from the network A or whether the condition matches a packet from the network C to the client terminal A, and the bridge coupling unit 24 is configured to perform an action for operating as a bridge.

The OpenFlow controller 62 is also configured to define the Flow Table such that the network apparatus 10 operates as the NAT coupling unit 26 for the packets from the network B and the packets from the network C to the client terminal B. In the OpenFlow switch 61, the routing controller 25 is configured to determine whether the condition matches a packet from the network B or the condition matches a packet from the network C to the client terminal B, and the NAT coupling unit 26 is configured to perform an action for the NAT control.

In OpenFlow technology, the control by the OpenFlow switch 61 can be changed dynamically. That is, even when a situation change occurs such that a situation where a condition A is satisfied is changed to a situation where a condition B is satisfied, only the action to be performed is changed. The network administrators do not need to stop the network apparatus 10 or do not need to restart the network apparatus 10. For example, the bridge coupling unit 24 can be made to operate as the NAT coupling unit 26, or the bridge coupling unit 24 and the NAT coupling unit 26 can be exchanged with each other. Accordingly, network systems are flexibly implemented.

<Operation Procedure Example>

FIG. 7A and FIG. 7B are sequence diagrams each illustrating processes when the client terminal A in the network A and the client terminal B in the network B communicate with the input and output apparatus 40, as one example.

<Communication between Client Terminal A and Input and Output Apparatus 40>

S1: The client terminal A in the network A transmits a packet to the network apparatus 10. There are several opportunities for transmission. One example is a case where a user requests a print job. The client terminal A determines that the input and output apparatus 40 is coupled with the same network, because a logical AND operation between the IP address of the client terminal A and the subnet mask is identical to a logical AND operation between the IP address of the input and output apparatus 40 and the subnet mask. Accordingly, the destination MAC address and the destination IP address may be set to the MAC address and the IP address of the input and output apparatus 40.

Source MAC address: XX:XX:XX:XX:XX:AA
Destination MAC address: XX:XX:XX:XX:XX:XX
Source IP address: 165.96.10.01 Destination IP address: 165.96.10.11

S2: The transmitter and receiver A of the network apparatus 10 receives the packet, as a communication route. The transmitter and receiver A reports to the routing controller 25 that the transmitter and receiver A has received the packet.

S3: The routing controller 25 detects that the NIC_A has received the packet, and refers to the communication routing control information storing unit 31.

S4: According to the communication routing control information, the NIC_A is coupled in a bridge method with the network C. Therefore, the routing controller 25 determines to forward the packet to the bridge coupling unit 24.

S5: The routing controller 25 forwards the packet to the bridge coupling unit 24.

S6: The bridge coupling unit 24 refers to the MAC address table, and learns that the destination MAC address: XX:XX:XX:XX:XX:XX is associated with the NIC_C. The bridge coupling unit 24 forwards the packet to the transmitter and receiver C configured to control the NIC_C, without changing either the destination MAC address or the destination IP address.

S7: The transmitter and receiver C transmits the packet to the input and output apparatus 40. The input and output apparatus 40 receives the packet, because the destination MAC address is the MAC address of the input and output apparatus 40.

Source MAC address: XX:XX:XX:XX:XX:AA
Destination MAC address: XX:XX:XX:XX:XX:XX
Source IP address: 165.96.10.01
Destination IP address: 165.96.10.11

S8: In order to respond to the client terminal A, the input and output apparatus 40 transmits a packet to the client terminal A in the network A. This time, the source IP address: 165.96.10.01 in step S7 is the destination IP address. Also in this case, the input and output apparatus 40 and the client terminal A are coupled with the same network, and the destination MAC address and the destination IP address are the MAC address and the IP address of the client terminal A.

Source MAC address: XX:XX:XX:XX:XX:XX
Destination MAC address: XX:XX:XX:XX:XX:AA
Source IP address: 165.96.10.11
Destination IP address: 165.96.10.01

S9: The transmitter and receiver C of the network apparatus 10 receives the packet at the NIC_C. The transmitter and receiver C reports to the routing controller 25 that the transmitter and receiver C has received the packet.

S10: The routing controller 25 detects that the NIC_C has received the packet, and refers to the communication routing control information.

S11: By referring to the communication routing control information, the routing controller 25 determines whether to forward the packet to the network A in the bridge method or to the network apparatus 10 in the NAT method. The input and output apparatus 40 simply transmits the packet to the network apparatus 10 as an interface or as a communication route. Since the destination MAC address is XX:XX:XX:XX:XX:AA, the routing controller 25 learns that the packet has been transmitted to an apparatus other than the network apparatus 10. From the destination IP address: 165.96.10.01 and the subnet mask, the routing controller 25 learns that the network address of the client terminal A is the same with the network address of the network A. Therefore, the routing controller 25 determines to forward the packet to the network A in the bridge method.

S12: The routing controller 25 forwards the packet to the bridge coupling unit 24.

S13: The bridge coupling unit 24 refers to the MAC address table, and forwards the packet to the transmitter and receiver A configured to control the NIC_A, because the destination MAC address: XX:XX:XX:XX:XX:AA is associated with the NIC_A, without changing either the destination MAC address or the destination IP address.

S14: The transmitter and receiver A forwards the packet to the client terminal A in the network A. The client terminal A receives the packet, because the destination MAC address is the MAC address of the client terminal A.

Source MAC address: XX:XX:XX:XX:XX:XX
Destination MAC address: XX:XX:XX:XX:XX:AA
Source IP address: 165.96.10.11
Destination IP address: 165.96.10.01

<Communication between Client Terminal B and Input and Output Apparatus 40>

S21: The client terminal B in the network B transmits a packet to the transmitter and receiver B configured to control the NIC_B. There are several opportunities for transmission. One example is a case where a user requests a print job. The client terminal B views the network apparatus 10 as the input and output apparatus 40. The client terminal B determines that the network apparatus 10 is coupled with the same network, because a logical AND operation between the IP address of the client terminal B and the subnet mask is identical to a logical AND operation between the IP address of the network apparatus 10 and the subnet mask. Accordingly, the destination MAC address and the destination IP address can be set to the MAC address and the IP address of the network apparatus 10.

Source MAC address: XX:XX:XX:XX:XX:BB
Destination MAC address: XX:XX:XX:XX:XX:BI
Source IP address: 192.168.5.01
Destination IP address: 192.168.5.100

S22: The transmitter and receiver B reports to the routing controller 25 that the transmitter and receiver B has received the packet.

S23: The routing controller 25 detects that the NIC_B has received the packet and refers to the communication routing control information.

S24: According to the communication routing control information, the NIC_B is coupled in the NAT method with the network C. Hence, the routing controller 25 determines to forward the packet to the NAT coupling unit 26.

S25: The routing controller 25 forwards the packet to the NAT coupling unit 26.

S26: The NAT coupling unit 26 refers to the NAT translation table.

S27: In the NAT translation table, the destination IP address to be translated to the IP address (165.96.10.11) of the input and output apparatus 40 is registered. The NAT coupling unit 26 translates the destination IP address of the packet to the IP address of the input and output apparatus 40. The source IP address may remain as the IP address of the client terminal B. At this timing, a new MAC address is not given. Source IP address: 192.168.5.01 Destination IP address: 165.96.10.11

S28: The NAT coupling unit 26 forwards the packet to the transmitter and receiver C.

S29: The transmitter and receiver C transmits the packet to the input and output apparatus 40. The input and output apparatus 40 receives the packet, because the destination MAC address is the MAC address of the input and output apparatus 40.

Source MAC address: XX:XX:XX:XX:XX:BI
Destination MAC address: XX:XX:XX:XX:XX:XX
Source IP address: 192.168.5.01
Destination IP address: 165.96.10.11

S30: In order to respond to the client terminal B, the input and output apparatus 40 transmits a packet to the network apparatus 10. The destination IP address is 192.168.5.01, which is the source IP address at step S29. The input and output apparatus 40 determines that the client terminal B is not coupled with the same network, because a logical AND operation between the IP address of the input and output apparatus 40 and the subnet mask is different from a logical AND operation between the IP address of the client terminal B and the subnet mask. Accordingly, the destination MAC address is set to the MAC address of the default gateway. For the purpose of description, it is assumed that the default gateway is the NIC_B of the network apparatus 10. Hence, the destination MAC address can be set to the MAC address of the NIC_B.

Source MAC address: XX:XX:XX:XX:XX:XX
Destination MAC address: XX:XX:XX:XX:XX:BI
Source IP address: 165.96.10.11
Destination IP address: 192.168.5.01

S31: The transmitter and receiver C of the network apparatus 10 receives the packet. The transmitter and receiver C reports to the routing controller 25 that the transmitter and receiver C has received the packet.

S32: The routing controller 25 detects that the NIC_C has received the packet, and refers to the communication routing control information.

S33: The routing controller 25 determines whether to forward the packet to the network A in the bridge method or to forward the packet to the network B in the NAT method. Since the destination MAC address is XX:XX:XX:XX:XX:BI, the routing controller 25 learns that the packet has been transmitted to the network apparatus 10 (that the communication route of the packet is to be controlled). In addition, from the destination IP address: 192.168.5.01 and the subnet mask, it is understood that the network address of the client terminal B is the same with the network address of the network B. Accordingly, the routing controller 25 determines to forward the packet to the network B in the NAT method.

S34: The routing controller 25 forwards the packet to the NAT coupling unit 26.

S35: The NAT coupling unit 26 refers to the NAT table.

S36: According to the NAT table, the IP address of the input and output apparatus 40 is associated with the IP address of the network apparatus 10. Hence, the NAT coupling unit 26 translates the destination IP address of the packet to the IP address of the network apparatus 10.

Source IP address: 192.168.5.100
Destination IP address: 192.168.5.01

S37: The NAT coupling unit 26 translates the destination MAC address to the MAC address of the client terminal B.

S38: The NAT coupling unit 26 forwards the packet to the transmitter and receiver B configured to control the NIC_B.

S39: The transmitter and receiver B transmits the packet to the client terminal B in the network B.

Source MAC address: XX:XX:XX:XX:XX:BI
Destination MAC address: XX:XX:XX:XX:XX:BB
Source IP address: 192.168.5.100
Destination IP address: 192.168.5.01

In this manner, the network apparatus 10 is capable of forwarding the packets from the networks A and B to the input and output apparatus 40, and is capable of forwarding the packets from the input and output apparatus 40 to the networks A and B.

<Variation>

In the process of FIG. 7A and FIG. 7B, the NIC_B serving as the default gateway for the input and output apparatus 40 has been described. For this reason, even in a case where the destination IP address of the packet to be transmitted from the input and output apparatus 40 is the IP address of the client terminal B (although the destination IP address is the IP address of the network apparatus 10 in a typical NAT), the packet is transmitted to the network apparatus 10 and is then transmitted to the client terminal B.

In contrast, as illustrated in FIG. 8, there is a case where the network A further includes a router 200 coupled to, for example, the Internet i. FIG. 8 illustrates a configuration diagram of the network system 100 similar to the network system 100 of FIG. 2. In FIG. 8, the router 200 is coupled with the network A and the router 200 is also coupled to the Internet i on the other side. In such a configuration, in the case where the default gateway is set to the NIC_B, when the input and output apparatus 40 attempts to transmit a packet through the router 200, the packet is transmitted to the NIC_B of the default gateway. Since the network apparatus 10 is configured not to transmit a packet to the network A from the network B (because the communication routing control information does not include such routing), the input and output apparatus 40 is not capable of transmitting a packet through the router 200 to the Internet i.

In order to avoid such an inconvenience, it is useful for the NIC_A to have the IP address and the MAC address. The NIC_A having the IP address and the MAC address enables a network administrator to set the default gateway for the input and output apparatus 40 to the IP address of the NIC_A. Accordingly, in the case where the input and output apparatus 40 transmits a packet through the router 200 to the Internet i, the network apparatus 10 learns from the routing table that the network apparatus 10 forwards the packet to the network A. Thus, the network apparatus 10 is capable of forwarding the packet from the NIC_A.

In contrast, in a case where the input and output apparatus 40 transmits a packet to the client terminal B in the network B, the input and output apparatus 40 transmits the packet to the default gateway (NIC_A) in the same manner; however, the network apparatus 10 learns from the MAC address and the IP address as described with reference to FIG. 7A and FIG. 7B that the network apparatus 10 needs to forward the packet to the network B. Therefore, the input and output apparatus 40 is capable of transmitting the packet through the router 200 and is also capable of transmitting the packet to the client terminal B.

FIG. 9A and FIG. 9B each illustrate a sequence diagram illustrating processes when the client terminal A in the network A and the client terminal B in the network B communicate with the input and output apparatus 40, in a case where a default gateway is in the network A, as one example. Note that in FIG. 9A and FIG. 9B, differences from the processes in FIG. 7A and FIG. 7B will be described mainly. In addition, in FIG. 9A and FIG. 9B, IP address 165.96.10.200 is assigned to the NIC_A serving as the default gateway for the input and output apparatus 40.

First, the processes in step S1 to step S29 may be the same as the processes in step S1 to step S29 in FIG. 7A and FIG. 7B.

S30: To respond to the client terminal B, the input and output apparatus 40 transmits a packet to the network apparatus 10. The destination IP address is the source IP address: 192.168.5.01 in step S29. The input and output apparatus 40 determines that the client terminal B is not coupled with the same network, because a logical AND operation between the IP address of the input and output apparatus 40 and the subnet mask is different from a logical AND operation between the IP address of the client terminal B and the subnet mask. Accordingly, the destination MAC address is set to the MAC address of the default gateway. As the default gateway is the NIC_A of the network apparatus 10, the destination MAC address is set to the MAC address of the NIC_A.

Source MAC address: XX:XX:XX:XX:XX:XX
Destination MAC address: XX:XX:XX:XX:XX:AI
Source IP address: 165.96.10.11
Destination IP address: 192.168.5.01

S31: The transmitter and receiver C of the network apparatus 10 receives the packet. The transmitter and receiver C reports to the routing controller 25 that the transmitter and receiver C has received the packet.

S32: The routing controller 25 detects that the NIC_C has received the packet, and refers to the communication routing control information.

S33: In the communication routing control information, the packet to be forwarded to the network A in the bridge method or to be forwarded to the network B in the NAT method is registered. As the destination MAC address is XX:XX:XX:XX:XX:AI, the routing controller 25 learns that the packet has been transmitted to the network apparatus 10 (that the communication route of the packet is to be controlled). Additionally, from the destination IP address: 192.168.5.01 and the subnet mask, the routing controller 25 learns that the network address of the client terminal B is the same with the network address of the network B. Accordingly, the routing controller 25 determines to forward the packet to the network B in the NAT method.

S34: The routing controller 25 forwards the packet to the NAT coupling unit 26.

S35: The NAT coupling unit 26 refers to the NAT table.

S36: According to the NAT table, the IP address of the input and output apparatus 40 is associated with the IP address of the network apparatus 10. Hence, the NAT coupling unit 26 translates the source IP address of the packet to the IP address of the network apparatus 10.

Source IP address: 192.168.5.100 Destination IP address: 192.168.5.01

S37: The NAT coupling unit 26 translates the destination MAC address to the MAC address of the client terminal B.

S38: The NAT coupling unit 26 forwards the packet to the transmitter and receiver B configured to control the NIC_B.

S39: The transmitter and receiver B forwards the packet to the client terminal B in the network B.

Source MAC address: XX:XX:XX:XX:XX:BI
Destination MAC address: XX:XX:XX:XX:XX:BB
Source IP address: 192.168.5.100
Destination IP address: 192.168.5.01

By assigning an IP address and a MAC address to the NIC_A and setting the NIC_A as the default gateway in this manner, the input and output apparatus 40 is capable of forwarding the packet through the router 200 and is also capable of forwarding the packet to the client terminal B.

Comparative Example

FIG. 10 illustrates a configuration diagram of a network system in a comparative example, in a case where the network apparatus 10 controls the communication route. In FIG. 10, the client terminal A and the input and output apparatus 40 are coupled with each other via the network A, and the client terminal B and a print server 70 are coupled with each other via the network B. The input and output apparatus 40 and the print server 70 are coupled with each other in one-to-one communication, for example, via a USB cable 71, instead of a network.

The print server 70 may be a computer for allowing another computer in a network to share a printer coupled to the print server 70. Originally, the print server 70 is utilized for allowing a plurality of computers to share a printer that is not equipped with a NIC, but is still often utilized even in a case where a printer is equipped with the NIC. This is because the print server 70 spools jobs transmitted from the computers and sequentially requests the printer to perform the jobs, and is thus capable of reducing burdens on the computers.

In the configuration of FIG. 10, in a case where the client terminal A is was hypothetically coupled with the print server 70, the configuration would be the same as the configuration in the related art. That is, the client terminals A and B are in the same network and information leakage might occur.

In contrast, in the configuration of FIG. 10, even in a case where the input and output apparatus 40 and the print server 70 are coupled with each other via the USB cable 71, no Ethernet (registered trademark) frames or no packets are transmitted or received. Therefore, there is almost no likelihood that information leakage occurs from the client terminal A to the client terminal B or vice versa. Further, the client terminal A and the client terminal are capable of sharing the input and output apparatus 40.

However, for example, from an administrator's terminal in the network B, it may be difficult to acquire Management Information Base (MIB) of the input and output apparatus 40 (More accurately, the MIB can be acquired by encapsulating the packets on a USB). MIB can be acquired through a Simple Network Management Protocol (SNMP), but SNMP is a protocol on TCP/IP networking. An administrator's terminal beyond such a network is capable of referring to or changing the settings of the input and output apparatus 40, but it is impossible for the administrator's terminal, for example, in the network B to access the settings.

In contrast, in the present embodiment, the network apparatus 10 is configured to control the communication route, the client terminal A and the input and output apparatus 40 are coupled with each other via the network A, and the client terminal B and the input and output apparatus 40 are coupled with each other via the network B. Therefore, both the client terminals A and B are capable of acquiring the MIB and capable of accessing the settings of the input and output apparatus 40.

In a case where the networks A to C are coupled via a router, instead of via the network apparatus 10, at least identical IP addresses assigned to hosts in different networks might cause the information leakage to each other. Even without such identical IP address, the presence of the gateway, for example, might transmit and receive information between different networks.

Working Example 2

In the present working example, a case where the network is divided into three networks will be described. In such a case, the input and output apparatus 40 is in the network C, which is different from the network with which the client terminal A is coupled.

FIG. 11 is a diagram schematically illustrating operations performed by the network apparatus 10 in the present embodiment. In FIG. 11, the client terminal A is coupled with the network A, the client terminal B is coupled with the network B, and the input and output apparatus 40 is coupled with the network C. Different network addresses are assigned to the network A and the network C. In such a configuration, almost the same communication routing control as the communication routing control in the working example 1 is enabled.

(i) The client terminal A in the working example 2 operates in the same manner as the client terminal B in the working example 1. Packets that have been transmitted from the client A pass through a router with the IP address of the network apparatus 10 as the destination IP address, and are then transmitted to the input and output apparatus 40. By passing through the router, the destination IP address of the packet to reach the input and output apparatus 40 is translated to the IP address of the network apparatus 10.

(ii) When the input and output apparatus 40 responds to the client terminal A, the input and output apparatus 40 transmits a packet to the network apparatus 10 as a destination, which is the default gateway, because the network addresses of the input and output apparatus 40 and the client terminal A are not the same. That is, the destination MAC address is set to the MAC address of the network apparatus 10 and the destination IP address is set to the IP address of the client terminal A. As the destination IP address is included in the network A, the network apparatus 10 refers to the NAT table and rewrites the destination MAC address to the IP address of the client terminal A. That is, the destination MAC address becomes the MAC address of the client terminal A and the destination IP address is the IP address of the client terminal A.

(iii) The process for transmitting the packets to the input and output apparatus 40 from the client terminal B and the process for transmitting the packets to the client terminal B from the input and output apparatus 40 are the same as the processes in the working example 1.

In the same manner as the working example 1, the client terminal A in the network A and the client terminal B in the network B, which is different from the network A, are capable of sharing the input and output apparatus 40. In addition, there is no likelihood that a packet leaks to the network B from the network A or to the network A from the network B.

In consideration of likelihood that the client terminals A and B have the identical IP addresses, the use of a port number is useful. When the input and output apparatus 40 responds to a packet from the client terminal A or a packet from the client terminal B, the destination IP address is the IP address of the client terminal A or the client terminal B, in either case. Identical IP addresses assigned to the client terminals A and B make communication control difficult. For this reason, registration of the IP addresses and the port numbers before and after the translation in the network apparatus 10 enables the communication control based on the port number.

In the working example 2, when the client terminal A transmits a packet to the network apparatus 10, a destination port number is translated to a port number of the input and output apparatus 40 from a port number of the network apparatus 10, according to a NAPT function to be described later. Since the input and output apparatus 40 sets the translated port number to the destination port number, the network apparatus 10 is capable of determining which one of a packet from the client terminal A or a packet from the client terminal B is in accordance with the port number. Therefore, even in a case where the IP addresses of the client terminals A and B are identical to each other, the network apparatus 10 is capable of controlling the respective communication routes of the packets from the client terminals A and B.

Note that in a similar manner to the working example 2, the network apparatus 10' and the network apparatus 10" are coupled with the networks A and B. The input and output apparatus 40' is coupled with the network apparatus 10' and the input and output apparatus 40" is coupled with the network apparatus 10". Due to space restrictions in the drawing, the network apparatus 10' seems to be coupled with the network apparatus 10, but the network apparatus 10' and the network apparatus 10 do not communicate with each other in practice. In the same manner, the network apparatus 10" does not communicate with the network apparatus 10' or the network apparatus 10 in practice.

The input and output apparatuses 40, 40', and 40" are in the network C. Hence, in a similar manner to the working example 1, the client terminals A and B are capable of using the input and output apparatuses 40, 40', and 40". Note that the input and output apparatuses 40, 40', and 40" may be in different networks respectively, such that the input and output apparatuses 40 is in the network C, the input and output apparatuses 40' is in a network D, and the input and output apparatuses 40 is in a network E.

<System Configuration>

In the working example 2, components that are identical or corresponding components to those previously defined in the working example 1 may have the same functions or operations. Hence, in some cases, only the substantial components that are relevant to the working example 2 are described. For example, the hardware configuration of the network apparatus 10 illustrated in FIG. 3 and the hardware configuration of the input and output apparatus 40 illustrated in FIG. 4 in the working example 1 are also used for description in the working example 2. Since components that are identical or corresponding components to those previously defined may have the same functions or operations, their descriptions are omitted or only the differences are described.

FIG. 12 is a diagram illustrating a network system where communication routes are controlled by the network apparatus, as one example. In FIG. 12, the input and output apparatus 40 is in the network C, and the NIC_C has an IP address. The IP address of the NIC_C of the input and output apparatus 40 is 165.96.20.100, and the subnet mask of the network C is 165.96.20.0/24. The IP address of the input and output apparatus 40 is 165.96.20.01.

The IP address of the NIC_C of the network apparatus 10' is 165.96.20.101, and the subnet mask of the network C is 165.96.20.0/24. The IP address of the input and output apparatus 40' is 165.96.20.02. The IP address of the NIC_C of the network apparatus 10" is 165.96.20.102, and the subnet mask of the network C is 165.96.20.0/24. The IP address of the input and output apparatus 40" is 165.96.20.03. Other configurations may be the same as the configurations in the working example 1.

Note that in the working example 2, the client terminals A and B view the network apparatus 10 as the input and output apparatuses 40, 40', and 40".

<Functionality>

FIG. 13 is a diagram schematically illustrating part of functionality operated by the input and output apparatus 40, as one example. As compared to FIG. 5 in the working example 1, the network apparatus 10 includes: a NAPT coupling unit 27 (hereinafter, referred to as a NAPT coupling unit A) instead of the bridge coupling unit 24; and a NAPT coupling unit 28 (hereinafter, referred to as a NAPT coupling unit B) instead of the NAT coupling unit 26.

The routing controller 25 in the working example 2 requests the NAPT coupling unit A or the NAPT coupling unit B to forward the packet in accordance with which one of the transmitter and receiver A or the transmitter and receiver B has received a packet. In a case where the transmitter and receiver C receives a packet, the routing controller 25 requests the NAPT coupling unit A or the NAPT coupling unit B to forward the packet in accordance with at least one of a destination port number or a source port number. In the same manner as the working example 1, the routing controller 25 refers to the communication routing control information in the communication routing control information storing unit 31 achieved by the RAM 504 and the HDD 508.

Table 4 indicates the communication routing control information in the working example 2, as one example. In the communication routing control information of Table 4, the network interface C has an IP address, and the forwarding methods of the network interfaces A to C are different from the methods indicated in Table 1. To be specific, the forwarding methods of the network interfaces A and B are both NAPT with the network C. In the forwarding method of the network interface C, when the destination port number is AAAA, "NAPT with the network A", and when the destination port number is BBBB, "NAPT with the network B".

The routing controller 25 refers to the communication routing control information, and controls the packets as follows.

When the transmitter and receiver A receives a packet, the routing controller 25 forwards the packet to the NAPT coupling unit A.
When the transmitter and receiver B receives a packet, the routing controller 25 forwards the packet to the NAPT coupling unit B.
When the transmitter and receiver C receives a packet, the routing controller 25 forwards the packet to the NAPT coupling unit A, in a case where the destination port number is AAAA (or in a case where the source port number is XXAA), and the routing controller 25 forwards the packet to the NAPT coupling unit B, in a case where the destination port number is BBBB (or in a case where the source port number is XXBB).

The NAPT coupling units A and B may be functionalities of mutually translating the IP address operating on the IP layer (Layer 3) in the OSI and the port number. Hence, the network apparatus 10 further includes: a NAPT table storing unit 33 (hereinafter, referred to as a NAPT table storing unit A) achieved by the RAM 504 and the HDD 508 illustrated in FIG. 3; and a NAPT table storing unit 34 (hereinafter, referred to as a NAPT table storing unit B). The NAPT coupling unit A is configured to refer to the NAPT table storing unit A, and the NAPT coupling unit B is configured to refer to the NAPT table storing unit B.

TABLE 4

| Network interface name | Subnet mask | IP address | Coupled network | Forwarding method |
| --- | --- | --- | --- | --- |
| NIC_A | 165.96.10.0/24 | 165.96.10.200 | Network A | NAPT with network C |
| NIC_B | 192.168.5.0/24 | 192.168.5.100 | Network B | NAPT with network C |
| NIC_C | 165.96.20.0/24 | 165.96.20.100 | Network C | Port number: AAAA (XXAA) NAPT with network A, Port number: BBBB (XXBB) NAPT with network B |

TABLE 5

| IP address before translation | IP address after translation | Port number before translation | Port number after translation |
| --- | --- | --- | --- |
| (a) | | | |
| 165.96.10.200 (Network apparatus) | 165.96.20.01 (Input and output apparatus) | CCAA (Network apparatus) | XXAA (Input and output apparatus) |
| (b) | | | |
| 192.168.5.100 (Network apparatus) | 165.96.20.01 (Input and output apparatus) | CCBB (Network apparatus) | XXBB (Input and output apparatus) |

Table 5(a) indicates a NAPT table A stored in the NAPT table storing unit A, as one example. The IP address translation is the same as the NAT table in the working example 1. The port number before translation is a port number (CCAA) set by the network apparatus 10 for the destination of the packet, and the port number after translation is a destination port number (XXAA) used for forwarding the packet to the input and output apparatus 40.

Table 5(b) indicates a NAPT table B stored in the NAPT table storing unit B, as one example. In Table 5(b), the NAPT table B has the same configuration as the NAPT table A, with the client terminal A simply changed to the client terminal B.

In a case where the client terminal A in the network A transmits a packet with the destination IP address (165.96.10.200) and the destination port number (CCAA) of the NIC_A of the network apparatus 10, the NAPT coupling unit A refers to the NAPT table A and translates the destination IP address to the IP address (165.96.20.01) of the input and output apparatus 40. The NAPT coupling unit A also translates the destination port number (CCAA) of the packet to the port number (XXAA) of the input and output apparatus 40.

The input and output apparatus 40 in the network C transmits the packet (responds) with the IP address (165.96.10.01) and the port number (AAAA) of the client terminal A set to the destination and the IP address (165.96.20.01) and the port number (XXAA) of the input and output apparatus 40 set to the source. The NAPT coupling unit A translates the source IP address (165.96.20.01) to the IP address (192.168.10.200) of the NIC_A of the network apparatus 10, and translates the source port number to the port number (CCAA) of the NIC_A of the network apparatus 10. The NAPT coupling unit B, through referring to the NAPT table B, performs the same process as the NAPT coupling unit A.

<Operation Procedure>

FIG. 14 is a sequence diagram illustrating communication between the client terminal A in the network A and the input and output apparatus 40, as one example. Note that in the working example 2, the communication between the client terminal B and the input and output apparatus 40 is not illustrated in FIG. 14, because the client terminal B can perform the same processes as the client terminal A. Additionally, since the procedure is the same as a whole as the communication of the client terminal B illustrated in FIG. 7A and FIG. 7B, mainly the differences are described.

S7: S7 corresponds to step S27 in FIG. 7B. In the NAPT translation table, the destination IP address is registered to be translated to the IP address (165.96.20.11) of the input and output apparatus 40. Thus, the NAPT coupling unit A translates the destination IP address of the packet to the IP address of the input and output apparatus 40. Additionally, the NAPT coupling unit A translates the destination port number (CCAA) to the port number (XXAA) of the input and output apparatus 40. The source IP address and the source port number remain as the IP address and the port number of the client terminal A without change.

Source IP address: 165.96.10.01
Destination IP address: 165.96.20.01
Source port number: AAAA
Destination port number: XXAA S8: S8 corresponds to step S28 in FIG. 7B. The NAPT coupling unit A forwards the packet to the transmitter and receiver C.

S9: S9 corresponds to step S29 in FIG. 7B. The transmitter and receiver C transmits the packet to the input and output apparatus 40. The input and output apparatus 40 receives the packet, because the destination MAC address is the MAC address of the input and output apparatus 40.

Source MAC address: XX:XX:XX:XX:XX:BI
Destination MAC address: XX:XX:XX:XX:XX:XX
Source IP address: 165.96.10.01
Destination IP address: 165.96.20.01
Source port number: AAAA
Destination port number: XXAA S10: S10 corresponds to step S30 in FIG. 7B. In order to respond to the client terminal A, the input and output apparatus 40 transmits a packet to the network apparatus 10. The destination IP address is the source IP address: 165.96.10.01 in step S9. The input and output apparatus 40 determines that the client terminal A is not coupled with the same network, because a logical AND operation between the IP address of the input and output apparatus 40 and the subnet mask is different from a logical AND operation between the IP address of the client terminal A and the subnet mask. Accordingly, the destination MAC address is set to the MAC address of the default gateway. For the purpose of description, it is assumed that the default gateway is the NIC_C of the network apparatus 10. Hence, the destination MAC address can be the MAC address of the NIC_C. The destination port number is the port number AAAA of the client terminal A.

Source MAC address: XX:XX:XX:XX:XX:XX
Destination MAC address: XX:XX:XX:XX:XX:CI
Source IP address: 165.96.20.01
Destination IP address: 165.96.10.01
Source port number: XXAA
Destination port number: AAAA S11: S11 corresponds to step S31. The transmitter and receiver C of the network apparatus 10 receives the packet. The transmitter and receiver C reports to the routing controller 25 that the transmitter and receiver C has received the packet.

S12: S12 corresponds to step S32 in FIG. 7B. The routing controller 25 detects that the NIC_C has received the packet, and refers to the communication routing control information.

S13: S13 corresponds to step S32 in FIG. 7B. In the communication routing control information, whether to forward the packet to the network A in the bridge method or to forward the packet to the network B in the NAT method in accordance with the destination port number is registered. In a case where the destination port number is AAAA or the source port number is XXAA, the NAPT coupling to the network A is to be performed. Hence, the routing controller 25 determines to forward the packet to the network A in the NAPT method.

S14: S14 corresponds to step S34 in FIG. 7B. The routing controller 25 forwards the packet to the NAPT coupling unit A.

S15: S15 corresponds to step S35 in FIG. 7B. The NAPT coupling unit A refers to the NAPT table A.

S16: S16 corresponds to step S36 in FIG. 7B. According to the NAPT table A, the IP address of the input and output apparatus 40 is associated with the IP address of the network apparatus 10. Therefore, the NAPT coupling unit A translates the source IP address of the packet to the IP address of the network apparatus 10. According to the NAPT table A, since the port number CCAA of the network apparatus 10 is associated with the port number XXAA of the input and output apparatus 40, the NAPT coupling unit A translates the source port number of the packet to the port number CCAA of the network apparatus 10.

Source IP address: 165.96.10.200
Destination IP address: 165.96.10.01
Source port number: CCAA
Destination port number: AAAA S17: S17 corresponds to step S37 in FIG. 7B. The NAPT coupling unit A translates the destination MAC address to the MAC address of the client terminal A.

S18: S18 corresponds to step S38 in FIG. 7B. The NAPT coupling unit A forwards the packet to the transmitter and receiver A configured to control the NIC_A.

S19: S19 corresponds to step S39 in FIG. 7B. The transmitter and receiver A transmits the packet to the client terminal A in the network A.

Source MAC address: XX:XX:XX:XX:XX:AI
Destination MAC address: XX:XX:XX:XX:XX:AA
Source IP address: 165.96.10.200
Destination IP address: 165.96.10.01
Source port number: CCAA
Destination port number: AAAA The network apparatus 10 is capable of forwarding packets from the networks A and B to the input and output apparatus 40 in this manner, and is capable of forwarding packets from the input and output apparatus 40 to the networks A and B.

FIG. 14 is a sequence diagram illustrating communication in a case where the default gateway is not set in the network A. However, in a case where the default gateway is set in the network A, the communication can be performed in the same manner as illustrated in FIG. 14. In the working example 2, the NIC_C is the default gateway and thus the NIC_C is capable of forwarding packets to the network A, in the case where the default gateway is set in the network A.

Other Application Examples

<Network Apparatus 10 Serving as Hardware Switch>

The network apparatus 10 illustrated in FIG. 3 according to the working examples has a hardware configuration to enable the OpenFlow switch 61 on a software basis. However, the network apparatus 10 may be configured by the OpenFlow switch 61 on a hardware basis.

FIG. 15A and FIG. 15B are diagrams illustrating configurations of the network apparatus 10, as one example. FIG. 15A is a hardware configuration of a Layer-3 switch illustrated for comparison. FIG. 15B is a hardware configuration of the network apparatus 10. As illustrated in FIG. 15A, the Layer-3 switch includes: a control plane 73, a data plane 74, and a backplane 75. The control plane 73 manages information needed for forwarding processes, and controls the entire network apparatus 10. The data plane 74 is responsible for the forwarding processes in Layer 2 and in Layer 3, and determines an appropriate physical port from header information to correspond to each communication protocol. The backplane 75 provides a mechanism of carrying the packets at high speed in the switch.

In the OpenFlow technology, the control plane may correspond to an OpenFlow controller 62, and the data plane 74 and the backplane 75 may correspond to an OpenFlow switch 61.

As illustrated in FIG. 15B, the data plane 74 mainly includes an ASIC 74a and a Ternary Content Addressable Memory (TCAM) 74b. The TCAM 74b is called content-addressable memory, and is a memory device that enables high-speed searching. OpenFlow conditions are described in the TCAM 74b, and the ASIC 74a performs an action (e.g., forwarding) that matches the condition. The ASIC 74a and the TCAM 74b are both hardware components and enable high-speed processing.

The backplane 75 mainly includes: a crossbar switch 75A and a plurality of NICs 507. The crossbar switch 75A serves as a bus in which a plurality of buses are constructed in a meshed pattern. An intersection in the meshed pattern is coupled or decoupled by a mechanical switch so as to form a single path. Since the number of data same as the number of paths can be transmitted and received simultaneously, high-speed forwarding is enabled. Note that the backplane 75 may be configured in a bus method or in a shared memory method.

In this manner, the network apparatus 10 in one or more embodiments can be operated as a hardware switch.

<Case where Network Apparatus 10 Is Incorporated into Input and Output Apparatus 40>

In the present embodiment, the input and output apparatus 40 and the network apparatus 10 have been described as separate apparatuses. However, the input and output apparatus 40 and the network apparatus 10 may be integrally formed.

FIG. 16 is a diagram illustrating the input and output apparatus 40 including the network apparatus 10. The network apparatus 10 included in the input and output apparatus 40 opens the interfaces of the NIC_A and the NIC_B to the outside, and the NIC_A and the NIC_B are respectively coupled with the network A and the network B. The NIC_C is coupled with a NIC_X originally included in the network apparatus 10. Accordingly, even in a case where the input and output apparatus 40 includes the network apparatus 10, the network apparatus 10 is capable of performing the same processes as in the above-described embodiments.

<Validity Period in NAPT Table>

In the NAPT table, a validity period can be set.

TABLE 6

| IP address before translation | IP address after translation | Port number before translation | Port number after translation | Validity period |
|---|---|---|---|---|
| 165.96.10.200 (Network apparatus) | 165.96.20.11 (Input and output apparatus) | CCAA (Network apparatus) | XXAA (Input and output apparatus) | 2016/XX/XX |

Table 6 indicates a NAPT table in which a validity period is set in the NAPT table in the working example 2. By setting such a validity period appropriately, an old entry (corresponding to one line in the NAPT table) is deleted (or is invalid). Therefore, even in a case where the number of client terminals coupled with the network apparatus 10 is increased and exceeds the maximum number of entries, communication is enabled.

In a case where no validity period is set, the network apparatus 10 may delete entries from the oldest one in the case where the number of entries exceeds the maximum number in the NAPT table. Therefore, even in the case where the number of client terminals coupled with the network apparatus 10 is increased and exceeds the maximum number of entries, communication is enabled.

<Other>

Heretofore, embodiments have been described with use of the working examples.

However, the present disclosure is not limited to the above-described embodiments or working examples. Various modifications, variations and alternatives should be possible within the scope of the present disclosure.

For example, in the working example 1, the NAT is performed in a reversed manner of a typical NAT. However, a typical NAT may be performed. In the working example 2, the NAPT is performed in a reversed manner of a typical NAPT. However, a typical NAPT may be performed.

For example, in the configuration examples of FIG. 5 and FIG. 13, components are divided in accordance with substantial functionality in order to facilitate understandings of the process performed by the network apparatus 10. How to divide units of processing or the names of components should not limit the present disclosure. Processing of the network apparatus 10 can be further divided into smaller units of processing in accordance with a processing content. Additionally, a single unit of processing can be divided to include more processes.

Note that the transmitter and receiver C is one example of a first communication unit.

The transmitter and receiver A is one example of a second communication unit. The transmitter and receiver B is one example of a third communication unit. The routing controller 25 is one example of a transmission destination determining unit. The network C is one example of a first network. The network A is one example of a second network. The network B is one example of a third network. The NIC_C is one example of a first network interface. The NIC_A is one example of a second network interface. The NIC_B is one example of a third network interface. The bridge coupling unit 24 is one example of a bridge coupling unit. The NAT coupling unit 26 is one example of a NAT coupling unit. A first NAPT converting unit is one example of the NAPT coupling unit 27. A second NAPT converting unit is one example of the NAPT coupling unit 28. The client terminal A is one example of a first device. The client terminal B is one example of a second device. The TCAM 74*b* is one example of a storing unit. The ASIC 74*a* is one example of a controlling unit.

The present application is based on and claims the benefit of priority of Japanese Patent Application No. 2016-086219 filed on Apr. 22, 2016 and Japanese Patent Application No. 2017-081999 filed on Apr. 18, 2017, the entire contents of which are incorporated herein by reference.

REFERENCE SIGNS LIST

10 network apparatus
21 to 23 transmitter and receiver
24 bridge coupling unit
25 routing controller
26 NAT coupling unit
27, 28 NAPT coupling unit
30 client terminal
31 communication routing control information storing unit
32 NAT table storing unit
33, 34 NAPT table storing unit
40 input and output apparatus

The invention claimed is:

1. A network apparatus comprising:
a plurality of network interfaces;
a memory; and
a processor that is coupled to the memory and that is configured to implement functions of:
a first communication unit configured to communicate with an input and output apparatus in a first network with which a first network interface of the plurality of network interfaces is coupled;
a second communication unit configured to communicate with a first device in a second network with which a second network interface of the plurality of network interfaces is coupled;
a third communication unit configured to communicate with a second device in a third network with which a third network interface of the plurality of network interfaces is coupled;
a bridge coupling unit configured to couple the second network and the first network in a bridge coupling method; and
a Network Address Translation (NAT) coupling unit configured to perform a NAT translation between the first network and the third network,
wherein when the second communication unit receives data from the second network, the data is transmitted to the first network through the first communication unit without being transmitted to the third network,
wherein when the third communication unit receives data from the third network, the data is transmitted to the first network through the first communication unit without being transmitted to the second network,
wherein the second communication unit forwards data between the second network and the first network without either a Media Access Control (MAC) address translation or a destination Internet Protocol (IP) address translation,
wherein the third communication unit forwards data between the third network and the first network with a MAC address translation and a destination IP address translation,
wherein the input and output apparatus is shared by the first device and the second device, and
wherein the input and output apparatus comprises at least a printer, a copier, a scanner, a facsimile apparatus, or a combination thereof.

2. The network apparatus according to claim 1,
wherein the processor is further configured to implement a function of a transmission destination determining unit configured to determine to which one of the second network and the third network data is to be transmitted, in accordance with communication routing control information in which information about to which one of the second network and the third network the data is to be transmitted is set, when the first communication unit receives the data from the input and output apparatus, and
wherein when the transmission destination determining unit determines that the data is to be transmitted to the second network, the transmission destination determining unit causes the second communication unit to transmit the data, and when the transmission destination determining unit determines that the data is to be transmitted to the third network, the transmission destination determining unit causes the third communication unit to transmit the data.

3. The network apparatus according to claim 2,
wherein in the communication routing control information, information that the data having been received from the second network is to be transmitted to the first network is registered, and information that the data having been received from the third network is to be transmitted to the first network is registered, and
wherein in the communication routing control information, information that data is to be transmitted to one of the second network and the third network in accordance with destination address information included in the data having been received from the first network is registered.

4. The network apparatus according to claim 1, wherein the first network and the second network have identical network addresses, and the first network and the second network have different network addresses from the third network.

5. The network apparatus according to claim 1,
wherein the second communication unit has an IP address and a MAC address, and
wherein the second communication unit is set as a default gateway of the input and output apparatus.

6. The network apparatus according to claim 1, wherein the first network and the second network have different network addresses, and the first network and the third network have different network addresses.

7. The network apparatus according to claim 6, wherein the processor is further configured to implement functions of:
a first Network Address Port Translation (NAPT) converting unit configured to convert a NAPT between the second network and the first network; and
a second NAPT converting unit configured to convert a NAPT between the third network and the first network.

8. The network apparatus according to claim 3, wherein the communication routing control information is changeable from outside the network apparatus.

9. A method executed by a network apparatus including a memory, and a processor that is coupled to the memory, the method comprising:
communicating with an input and output apparatus by a first communication unit via a first network interface coupled with a first network;
communicating with a first device by a second communication unit via a second network interface coupled with a second network;
communicating with a second device by a third communication unit via a third network interface coupled with a third network;
coupling the second network and the first network in a bridge coupling method; and
performing a Network Address Translation (NAT) translation between the first network and the third network,
wherein the memory is configured to store information that data is to be forwarded from the second network to the first network without being transmitted to the third network and data is to be forwarded from the third network to the first network without being transmitted to the second network,
wherein the processor is configured to refer to the information stored in the storing unit, and to forward the data from the second network to the first network without being transmitted to the third network and forward the data from the third network to the first network without being transmitted to the second network,
wherein data is forwarded between the second network and the first network without either a Media Access Control (MAC) address translation or a destination Internet Protocol (IP) address translation,
wherein data is forwarded between the third network and the first network with a MAC address translation and a destination IP address translation,
wherein the input and output apparatus is shared by the first device and the second device, and
wherein the input and output apparatus comprises at least a printer, a copier, a scanner, a facsimile apparatus, or a combination thereof.

10. A non-transitory recording medium storing program instructions for causing an information processing apparatus including a plurality of network interfaces, and a processor that is coupled to the non-transitory recording medium to perform:
communicating, by a first communication unit, with an input and output apparatus in a first network with which a first network interface of the plurality of network interfaces is coupled;
communicating, by a second communication unit, with a first device in a second network with which a second network interface of the plurality of network interfaces is coupled;
communicating, by a third communication unit, with a second device in a third network with which a third network interface of the plurality of network interfaces is coupled;
coupling the second network and the first network in a bridge coupling method; and
performing a Network Address Translation (NAT) translation between the first network and the third network,
wherein when data is received from the second network, transmitting the data to the first network through a first communication unit for communicating with the input and output apparatus in the first network, without transmitting the data to the third network,
wherein when data is received from the third network, transmitting the data to the first network through the first communication unit, without transmitting the data to the second network,
wherein data is forwarded between the second network and the first network without either a Media Access Control (MAC) address translation or a destination Internet Protocol (IP) address translation,
wherein data is forwarded between the third network and the first network with a MAC address translation and a destination IP address translation,
wherein the input and output apparatus is shared by the first device and the second device, and
wherein the input and output apparatus comprises at least a printer, a copier, a scanner, a facsimile apparatus, or a combination thereof.

* * * * *